US008666896B1

(12) United States Patent
Kempkes et al.

(10) Patent No.: US 8,666,896 B1
(45) Date of Patent: *Mar. 4, 2014

(54) SYSTEM, METHOD, AND BUSINESS METHOD FOR SETTLING MICROPAYMENT TRANSACTIONS TO A PRE-PAID INSTRUMENT

(75) Inventors: Rodney J. Kempkes, Omaha, NE (US);
Mark J. Pettay, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,130

(22) Filed: Jul. 10, 2012

Related U.S. Application Data

(63) Continuation of application No. 12/039,026, filed on Feb. 28, 2008, now Pat. No. 8,244,633, which is a continuation of application No. 09/849,777, filed on May 4, 2001, now Pat. No. 7,440,922.

(51) Int. Cl.
*G06Q 40/00* (2012.01)

(52) U.S. Cl.
USPC ............................................. 705/44; 705/40

(58) Field of Classification Search
USPC ....................................................... 705/3–44
See application file for complete search history.

(56) References Cited

U.S. PATENT DOCUMENTS

| | | | |
|---|---|---|---|
| 3,752,904 A * | 8/1973 | Waterbury ....................... | 725/25 |
| 4,530,232 A * | 7/1985 | Smith ............................. | 72/447 |
| 4,752,676 A * | 6/1988 | Leonard et al. ............... | 235/379 |
| 4,845,658 A * | 7/1989 | Gifford .......................... | 709/217 |
| 5,530,232 A | 6/1996 | Taylor | |
| 5,577,109 A * | 11/1996 | Stimson et al. ............ | 379/114.2 |
| 5,578,808 A | 11/1996 | Taylor | |
| 5,621,787 A * | 4/1997 | McKoy et al. ........... | 379/121.06 |
| 5,655,008 A | 8/1997 | Futch et al. | |
| 5,655,088 A * | 8/1997 | Midorikawa et al. ........... | 705/37 |

(Continued)

FOREIGN PATENT DOCUMENTS

| | | |
|---|---|---|
| DE | 4411271 | 10/1995 |
| EP | 387046 | 9/1990 |

(Continued)

OTHER PUBLICATIONS

Shirkey, Clay, The Case Against Micropayments, The OReilly Network, www.oreillynet.com/pub/a/p2p/2000/12/19/micropayments.html .1201.*

(Continued)

*Primary Examiner* — Frantzy Poinvil

(57) ABSTRACT

The invention provides a method, business method, and system for conducting micropayment transactions between consumers and merchants. A merchant offers micropayment transactions to a consumer. The micropayment transaction is authorized, and the micropayment transaction is executed between the merchant and the consumer. A value parameter associated with a prepaid instrument, such as a prepaid calling card, is decremented by an amount corresponding to the value provided by the merchant. A payment is transferred to the merchant to settle the micropayment transaction. The invention also provides a system for conducting micropayment transactions between consumers and merchants. At least one prepaid calling card is issued to a consumer in exchange for a payment from the consumer. A merchant site conducts micropayment transactions and accepts the prepaid calling card as payment. A clearinghouse receives data associated with the prepaid calling card from the merchant site and processes the data to settle the micropayment transaction.

33 Claims, 26 Drawing Sheets

(56) References Cited

U.S. PATENT DOCUMENTS

| | | | | |
|---|---|---|---|---|
| 5,721,768 | A | * | 2/1998 | Stimson et al. .......... 379/114.16 |
| 5,729,594 | A | * | 3/1998 | Klingman .................. 379/93.12 |
| 5,729,693 | A | * | 3/1998 | Holda-Fleck .............. 705/14.26 |
| 5,748,908 | A | * | 5/1998 | Yu .................................. 705/44 |
| 5,815,657 | A | * | 9/1998 | Williams et al. ................ 705/35 |
| 5,909,486 | A | * | 6/1999 | Walker et al. ............ 379/114.11 |
| 5,915,007 | A | * | 6/1999 | Klapka .................... 379/114.18 |
| 5,917,168 | A | * | 6/1999 | Nakamura et al. ............. 235/379 |
| 5,923,734 | A | * | 7/1999 | Taskett .................... 379/114.18 |
| 5,987,155 | A | | 11/1999 | Dunn et al. |
| 5,988,509 | A | | 11/1999 | Taskett |
| 6,000,608 | A | | 12/1999 | Dorf |
| 6,011,858 | A | | 1/2000 | Stock et al. |
| 6,032,136 | A | | 2/2000 | Brake, Jr. et al. |
| 6,101,051 | A | | 8/2000 | Sugita et al. |
| 6,105,008 | A | | 8/2000 | Davis et al. |
| 6,115,458 | A | | 9/2000 | Taskett |
| 6,118,860 | A | | 9/2000 | Hillson et al. |
| 6,126,069 | A | | 10/2000 | Stiefel et al. |
| 6,134,309 | A | | 10/2000 | Carson |
| 6,137,872 | A | | 10/2000 | Davitt et al. |
| 6,149,056 | A | | 11/2000 | Stinson et al. |
| 6,227,447 | B1 | | 5/2001 | Campisano |
| 6,424,706 | B1 | | 7/2002 | Katz et al. |
| 2002/0091632 | A1 | | 7/2002 | Turock et al. |

FOREIGN PATENT DOCUMENTS

| | | |
|---|---|---|
| JP | 408315222 | 11/1996 |
| JP | 411203544 | 7/1999 |
| WO | W09825237 | 6/1998 |
| WO | W09924921 | 5/1999 |

OTHER PUBLICATIONS

Shirkey, Clay, The Case Against Micropayments. The O'Reilly Network, www.oreillynet.com/pub/a/p2p/2000/12/19/micropayments.html.

Suzanne Keough & Gary Morgenstern, AT&T Launches AT&T PrePaid Web Cents Service, PR Newswire, Apr. 1, 2003.

Adam L. Knapp, OmniSky Israel—Tracking Urban Nomads, Daily Technology Watch, www.accenture.com, Apr. 8, 2003.

ECashServices.com, Documents from www.ecashservices.com, Oct. 23, 2001.

Tedeschi, Bob, E-Commerce Report, Companies are trying once again to find ways to turn penny-ante charges for Web viewing into profits, The New York Times, Monday, Jul. 21, 2003.

Bergstein, Brian, Companies Explore 'Micropayments' Idea, Yahoo News Website, Dec. 1, 2003.

Voicelog, VoiceLog Offers Industry-Wide Solution to "Cramming", Press Release, www.voicelog.com, Apr. 21, 1998.

Duocash, DuoBill Portal Released, Press Release. www.duocash.com, Jan. 3, 2004.

Duocash, Alnet Uses DuoCash Technology for the Launch of their Micro-Payment System for Paid Downloads on Kazaa, Press Release, www.duocash.com, Sep. 24, 2002.

Duocash, Industry Leader GTS PrePaid Introduces DuoCash-Enabled Phone Cards, Press Release, www.duocash.com, Jun. 10, 2002.

Duocash, Enabling Prepaid Phone Cards for Online Payment, Advertising Brochure.

Duocash, Auris Technology Adds DuoCash to Prepaid Offers, Press Release, Oct. 4, 2004.

Wmode.com, Monetize Small-Value Transactions (Micro Payments), www.wmode.com, Dec. 17, 2002.

Rosen, Cheryl, The Cashless Cabbie, Informationweek.com, Aug. 16, 2001.

Freedompay, How FreedomPay Works, www.freedompay.com.

American Express, American Express and 7-11 Team up to Offer Prepaid Internet Card, Online News Release, Jun. 22, 2000.

Borzo, Internet Renews Interest in Micropayments, The Wall Street Journal, Apr. 10, 2007, p. B8.

Bruno, Michael P., MicroCreditCard to Launch Micro Payment Service, Washtech.com, www.washtech.com, Aug. 19, 2000.

Cardline, Virgin to Teach Blue Cardholders How to Use Chips and Planned Chip Card Would Be Able to Make $1 Purchase. email to distribution list, May 9, 2001.

Cheng, Shopping by Cellphone, Asiaweek.com, vol. 26, No. 9, Jul. 28, 2000.

Chi, Ellis, Evaluation of Micropayment Schemes, HPL-97-14, Jan. 20, 1997.

Duocash, $5.2 Billion is Stored on Prepaid Calling Cards, Webpage, New York Times, Apr. 9, 2001.

Excerpt from an email patent news subscription from clients@bustpatents.com, Sep. 17, 2001.

Halfbakery, Micropayment Email, Webpage, Jun. 15, 2000.

Internet Dollar, Internet Dollar webpage entitled Internet Dollar is the money of the Internet, Sep. 19, 2001.

McGarvey, Small Change—Mircropayments Enable Teensy Content Purchases, Econent, Jul. 1, 2001, p. 18-21.

McKay, Cyber Calling Cards, Teledotcom, Jan. 22, 2001.

Mojo Nation, Key Features of the Mojo Nation Technology, www.mypoints.com, 2000.

Mypoints, Documents from www.mypoints.com, Apr. 27, 2001.

NTT Docomo, Coca-Cola Japan, NTT DoCoMo, Itochu Agree to Test New Service that Links I-mode with Vending Machines, Online news release, Mar. 28, 2001.

Qpass, Qpass Digital Commerce Service, Webpage, 1998-2001.

Rose, Amazon Wants to Sell Your Stuff, Wired.com News, Feb. 6, 2001.

Rosen, Cheryl, Amazon Counts Every Dollar, InformationWeek.com News, Feb. 12, 2001.

Rudnick, Financial Firm Launches Teen Spending Card.

Sky Go, Documents from www.skygo.com, Mar. 16, 2001.

Sky Go, Qpass and SkyGo Team to Add Functionality to Wireless Marketing Offers, Webpage, Jan. 2, 2001.

Transaction Net, Micropayment Methods, Webpage.

W3C, Micropayments Overview, Webpage, Jan. 23, 2001.

* cited by examiner

Home ← 72a

Photos ← 72b

Articles ← 72c

Games ← 72d

Welcome to this application.

Please select an option from the list on the left.

Portal ← 72e

190

72 bsanantonio.jpg is available for $0.50. This amount will be deducted from your card account.

Continue

192

Units Available: 237
Unit = $0.05

Amount Available: $11.85
Price: $0.50

New Card Balance: $11.35

Units Removed: 10 (10)

Figure 19c

2000qtr4.htm is available for $1.15. This amount will be deducted from your card account.

Continue

193

Units Available: 433
Unit = $0.1

Amount Available: $43.30
Price: $1.15

New Card Balance: $42.15

Units Removed: 12 (11.5)

Figure 19d asteroids/asteroids3.htm is available for $3.00. This amount will be deducted from your card account.

Continue

194

Units Available: 237
Unit = $0.05

Amount Available: $11.85
Price: $3.00

New Card Balance: $8.85

Units Removed: 60 (60)

Figure 19e

Alternative Payment Portal

172

View Transaction History
    VIEW HISTORY OF CARD USE AND PURCHASES MADE.

173

View Card Balances
    VIEW CARD PRICE PER UNIT AND UNITS AVAILABLE

174

Add Units to Card
    ADD UNITS TO CARD (CREDIT CARD REQUIRED)

175

Participating Sites
    VIEW WEB SITES PARTICIPATING IN PHONE CARD PURCHASE PROGRAM.

182

Affiliation Program
    LEARN MORE ABOUT OUR AFFILIATE PROGRAM

183

Site Rating System
    LEARN MORE ABOUT THE SITE RATING SYSTEM AND CARD RATINGS

Alternative Payment Portal

View Transaction History

Transaction History for 222222222222222

Account Credits

| Type | Description | Price | Units | Date | |
|---|---|---|---|---|---|
| Recharge | portal | $1.50 | 30 | 4/27/01 | 11:04:27 AM |
| Recharge | portal | $10.00 | 200 | 4/27/01 | 1:52:35 PM |
| Gamecredit | asteroids | $5.00 | 100 | 4/27/01 | 2:09:53 PM |

Account Debits

| Type | Description | Price | Units | Date | |
|---|---|---|---|---|---|
| article | Pensacola.htm | $0.95 | 19 | 4/27/01 | 1:47:23 PM |
| article | 2000qtr4.htm | $1.15 | 23 | 4/27/01 | 2:08:10 PM |
| pame | asteroids/asteroids3.htm | $3.00 | 60 | 4/27/01 | 2:08:44 PM |
| photo | omahaheart.jpg | $0.80 | 16 | 4/30/01 | 4:52:12 PM |
| photo | bsanantonio.jpg | $0.50 | 10 | 5/1/01 | 2:33:14 PM |

Alternative Payment Portal

View Balance

Balance for 222222222222222

| Units Available | Value per Unit | Total $ Amount |
|---|---|---|
| 237 | $0.05 | $11.85 |

197

174

Alternative Payment Portal

Add Units to Card

| | | |
|---|---|---|
| Card Number | | * |
| Amount to Add | $ | * |
| Payment Information | | |
| Credit Card Type | | * |
| Credit Card Number | | * |
| Expiration | (MMYYYY)* | |
| Name on Credit Card | | |
| | | * |

SYSTEM, METHOD, AND BUSINESS METHOD FOR SETTLING MICROPAYMENT TRANSACTIONS TO A PRE-PAID INSTRUMENT

CROSS-REFERENCE TO RELATED APPLICATIONS

The present patent application is a continuation of and claims priority from patent application Ser. No. 12/039,026, filed Feb. 28, 2008 and titled System, Method, and Business Method for Settling Micropayment Transactions to a Pre-Paid Instrument now issued U.S. Pat. No. 8,244,633, which is a continuation of and claims priority from patent application Ser. No. 09/849,777, filed May 4, 2001 and titled System, Method, and Business Method for Settling Micropayment Transactions to a Pre-Paid Instrument, now issued U.S. Pat. No. 7,440,922, issued Oct. 21, 2008, each of which is incorporated by reference herein in their entirety.

BACKGROUND OF THE DISCLOSURE

In recent years, new businesses have sprung up that are based almost entirely on the on-line "e-business" model. Existing brick-and-mortar businesses have been rapidly transforming their business models to bring their commerce on-line. Accordingly, purchasing goods or services electronically over a wide area network, such as the World Wide Web is known. It is also known that for financial transactions using credit cards or debit cards to pay for such purchases entails certain transaction costs, expressed in terms of dollars per transaction. For sales involving sufficient dollar amounts as determined by the financial circumstances of a given business, that business can rationally incur these transaction costs to execute the sale because the profit gained by executing the sale sufficiently exceeds the transaction costs. "Micropayment" transactions, in which the economic value exchanged during the transaction is relatively small as compared to the per-transaction costs associated with credit cards or debit cards, are known and are in increasing demand. However, it may not be economically rational to use such cards for micropayment transactions because the transaction cost may exceed the value of the underlying purchase. In other words, why incur a $5.00 US transaction cost to execute a purchase of goods or services with an economic value of only $0.50 US?

Because of the above circumstances, there is a continuing demand for the ability to conduct and settle micropayment transactions to purchase goods or services over the Internet and through other commercial avenues for reaching consumers. For example, World Wide Web sites featuring downloading/sharing of audio or video data, downloading of magazine or newspaper articles, on-line gaming, and on-line gambling typically charge relatively low fees per transaction to their customers. Generally, these fees fall in the range of $0.50 US to $10.00 US. These sites, and other sites similarly situated, are currently facing the challenge of economically conducting and settling on-line micropayment transactions with their customers.

Several alternatives have been proposed to address this issue. Known "smart" cards (Smart Card) contain microprocessors, memory, and stored program code, and typically function by storing a certain value on-board the card. The Smart Card then enables merchants and consumers to decrement that value as purchases are made and to increment that value as the card is "re-charged" with additional value. Smart Cards offer certain advantages that might make them suitable in certain on-line transactions; however, the cost of these advantages may be difficult to justify in the micropayment context. Specifically, Smart Cards generally contain advances security features that are embedded in the technology used to fabricate the Smart Card. These security features enable consumers to conduct Smart Card transactions with a relatively high degree of security. For example, the Smart Card can support the use of personal identification numbers (PINs), passwords or possibly biometric data to authenticate the consumer as a safeguard against fraud. However, this same technology makes the Smart Card relatively expensive to manufacture and the Smart Card itself is generally not considered a disposable item. The above security features can also require the merchants to provide an expensive infrastructure such as card readers, scanners or biometric equipment at the merchant site. Also, the security features inherent in Smart Card design can prevent the Smart Card from being used anonymously, which can be important to consumers when conducting some on-line transactions. Further, the above security features can entail infrastructure and transaction costs that are sufficiently high to discourage use of Smart Cards for micropayment transactions.

Many websites conduct on-line business with consumers by enabling them to charge purchases to bank-issued credit cards, or by authorizing debit card transactions to cover those purchases. However, banks typically levy a transaction fee for settling such purchases, and once again, these per-transaction fees can be sufficiently high to discourage acceptance of conventional credit or debit cards to conduct and settle micropayment transactions. Further, the use of credit cards on-line entails risk that sensitive information such as account numbers and/or expiration dates may be misappropriated and used in subsequent fraudulent transactions. Unwinding such fraudulent transactions imposes significant expense and inconvenience upon any merchants and banks inadvertently involved in those fraudulent transactions, not to mention the consumer that legitimately owns the account. Should the credit card account be compromised by fraud, the consumer and/or bank faces risk bounded only by the credit limit on the account which could be as high as $100,000.00 US. Although, for example, VISA® and MasterCard® limit consumer risk to $50.00, the issuing bank would face the rest of the risk up to the credit limit on the given card. Also, credit card transactions are typically not anonymous transactions because of the intrinsic nature of how credit cards are issued and processed. This lack of anonymity and related privacy concerns can discourage credit card purchases in some types of on-line commerce.

Specialized cards with matching devices and networks have also been proposed as well. However, these proposals can entail significant infrastructure costs such as the cost of producing the specialized card, of producing and installing card readers or other specialized hardware at the physical location of each retailer and/or consumer participating in the network and of implementing and maintaining the network itself. These infrastructure costs translate into high per-transaction costs that can limit use of such cards and networks for micropayment transactions and also discourage additional on-line merchants from joining the network by increasing the start-up costs associated with joining the network. Also, such specialized cards and networks typically do not provide anonymity to consumers using such cards and networks.

As the preceding discussion illustrates, there exists a continuing need for systems, methods and business methods that enable execution and settlement of micropayment transactions. Such systems, methods and business methods would preferably entail minimal transaction costs, capitalize on existing infrastructure rather than necessitating new infrastructure, promote consumer anonymity, and expose consumers to (at most) a fixed and minimal risk of theft or misappropriation.

SUMMARY OF THE DISCLOSURE

The invention provides a method for conducting micropayment transactions between consumers and merchants, perhaps using a retail intermediary. In summary, the method comprises the following steps. A merchant offers micropayment transactions to a consumer, during which transaction a merchant provides value to the consumer. The consumer presents data from a prepaid instrument, such as a prepaid calling card, or possibly the prepaid calling card itself, as payment for the value. The micropayment transaction is authorized for settlement and is executed to completion between the merchant and the consumer. A value parameter associated with the prepaid calling card is decremented by an amount corresponding to the value provided by the merchant. A payment is transferred to the merchant to settle the micropayment transaction.

The invention also provides a system for conducting micropayment transactions between consumers and merchants with the system comprising the following components. At least one prepaid calling card is issued to a consumer in exchange for a payment from the consumer. A merchant site conducts micropayment transactions and accepts the prepaid calling card as payment for the micropayment transaction, during which transaction the merchant provides value to the consumer and the consumer presents a prepaid calling card as payment for the value. A clearinghouse receives data associated with the prepaid calling card from the merchant site and processes the data to settle the micropayment transaction.

Finally, the invention provides a business method for conducting micropayment transactions between consumers and merchants, with the business method comprising the following steps. A merchant offers micropayment transactions to a consumer, during which transaction the merchant provides a first amount of value to the consumer and the consumer presents data from a prepaid calling card as payment for the first amount of value. A decrement of a value parameter associated with the prepaid calling card by the first amount of value is authorized and the micropayment transaction is executed. The value parameter is decremented by the first amount of value. A payment having a second amount of value is collected from an entity holding the settlement funds. The first amount of value is greater than the second amount of value thereby generating a first profit to the issuing entity equal to the difference between the first amount of value and the second amount of value. The payment is routed to a clearinghouse entity for ultimately settling the micropayment transaction. A payment of a third amount of value is transferred from the clearinghouse entity to the merchant to settle the micropayment transaction. The second amount of value is preferably greater than the third amount of value, thereby generating a second profit to the clearinghouse entity equal to the difference between the second amount of value and the third amount of value.

BRIEF DESCRIPTIONS OF THE DRAWINGS

FIG. 19c is a diagram of an illustrative webpage accessible from the webpage shown in FIG. 19b, should the consumer select one of the photo links shown therein, such as the "West in San Antonio" link.

FIG. 19d is a diagram of an illustrative webpage accessible from the webpage shown in FIG. 19a, should the consumer select the "Articles" link shown therein.

FIG. 19e is a diagram of an illustrative webpage accessible from the webpage shown in FIG. 19a, should the consumer select the "Games" link shown therein.

FIG. 19f is a diagram of an illustrative webpage accessible from the webpage shown in FIG. 19a, should the consumer select the "Portal" link shown therein.

FIG. 19g is a diagram of an illustrative webpage accessible from the webpage shown in FIG. 19f, should the consumer select the "View Transaction History" link shown therein.

FIG. 19i is a diagram of an illustrative webpage accessible from the webpage shown in FIG. 19f, should the consumer select the "Add Units to Card" link shown therein.

DETAILED DESCRIPTION OF ILLUSTRATIVE EMBODIMENTS

Overview of the Invention

The invention provides systems, methods and business methods for settling at least one micropayment transaction between at least one consumer and at least one merchant over a wide area network using a prepaid instrument. The prepaid instrument may be, for example, a prepaid calling card or a prepaid phone card, as those terms are understood in the art. Any prepaid instrument that is associated with an account containing a decrementable value may be suitable for practicing the invention.

Prepaid calling cards are well known and when a prepaid calling card is issued, an account is created that stores a value parameter associated with the prepaid calling card. A PIN is associated with this account for security, and a card is manufactured that corresponds to this account. The card typically bears a toll-free access number that the consumer dials to access the network, along with the PIN, which the consumer must enter to access the phone network and place telephone calls. The prepaid calling cards are issued and sold in various denominations of value expressed in terms of either time or currency. By purchasing the prepaid calling card, the consumer obtains the right to use this value. In conventional use of prepaid calling cards, the consumer accesses that value by dialing the telephone number shown on the card, entering the PIN, and then dialing a target telephone number. As the consumer makes those calls, value is deducted from the account associated with the consumer's prepaid calling card. When no value remains in the account, the consumer can make no further calls, and the prepaid calling card essentially expires.

Figure 19:
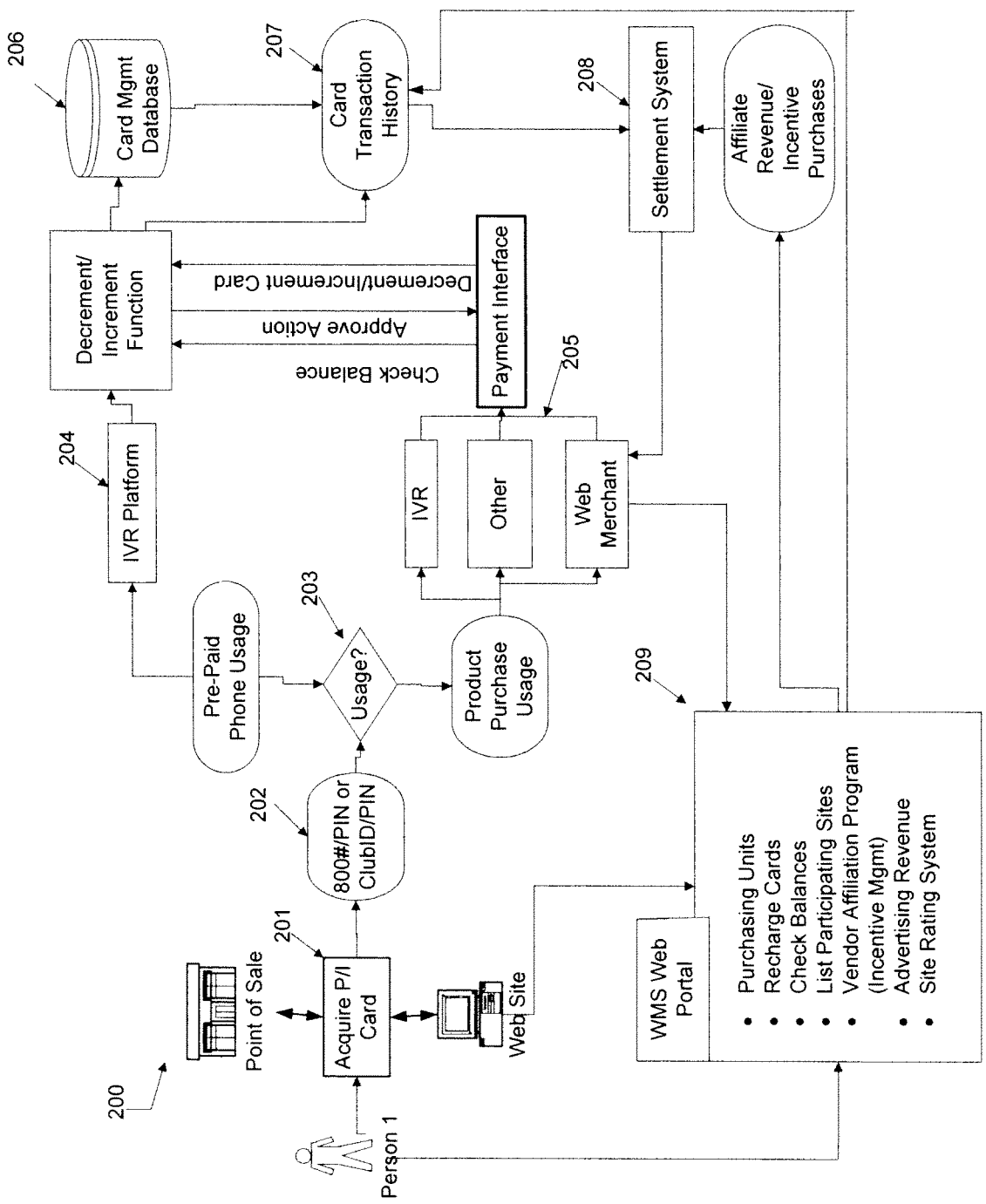
FIG. 19 is a combined block diagram and flow chart illustrating a method and mechanism for providing and using a combined phone/internet prepaid calling card (P/I card).

FIG. 19 is a combined block diagram and flow chart illustrating a method and mechanism for providing and using a combined phone/internet prepaid calling card (P/I card). This card can be provided in either physical or electronic format and can use a card Identifier/Personal Identification Number (ID/PIN) code combination to manage tracking units that are tied to a cash value. These units could be used as traditional pre-paid phone minutes or as monetary value used to conduct micropayment transactions to purchase products or services from participating merchants.

As shown at block 201, a consumer can acquire a P/I card from a traditional point-of-sale (POS) outlet, a web site, or as part of a club-type membership. Other options for obtaining the card are discussed above.

As shown at block 202, the P/I card comes with a source identifier, such as a "1-800" access number or a club identifier (ID), and a PIN code associated with the card. In the case of a club-based card, it may be necessary for a member to use all 3 items (800#, club ID, and PIN) to use the card for pre-paid phone time.

As shown at block 203, there are 2 primary usage models for the P/I card:

Pre-Paid Phone Usage—This is the standard existing model with the necessary infrastructure already in place. Example transactions here include offering consumers access to the public telephone network to make telephone calls. The units on the card have a predetermined value and various per-minute rates are charged based on call type (domestic, international that varies by country, etc).

Product Purchase Usage—In this model, the invention extends the pre-paid calling card infrastructure to support consumer purchases of goods/services through micropayment transactions. In these transactions, the merchant is offering goods/services other than access to the public telephone network for making telephone calls. For a given micropayment transaction, the merchant would determine the number of units that it would charge to fulfill that micropayment transaction (play game, view article, 1 day memberships, etc). This could be viewed in the same manner as international calls where there is a premium for that service versus domestic. Based on its contract with the card issuer and/or the settlement clearinghouse, a given merchant would know its transaction cost associated with each unit (ex: $0.05) and could set retail pricing as it sees fit.

As shown at block 204, if the consumer uses the card to pay for telephone calls, the consumer interacts with an existing Interactive Voice Response (IVR) platform. The IVR validates the pre-paid card and tracks the available minutes remaining on the card. It also connects the caller with the number they are calling and notifies the caller where time has expired.

As shown at block 205, several channels are available to use the card to conduct micropayment transactions, as discussed above. The web merchant embodiment is described here, but the same features would apply for IVR and the other P/I card sales channels. The web site would include the payment option for P/I cards, and the logic described could be provided to the merchant to embed on the site. This logic would provide security support that is similar to that offered during credit card transactions conducted on the site. The website would present the cost of the goods/services being offered to the consumer, in terms of generic value units, minutes, or otherwise. The consumer would enter his/her ID/PIN and submit the proposed transaction. A message would be sent to the card processor to verify that the P/I card held enough units to authorize the transaction.

If the P/I card holds enough units to authorize the transaction, the card would be decremented and the service provided or product sale completed, while capturing any other personal information from the consumer that is necessary for fulfillment. The transaction is then approved for eventual settlement.

If the P/I card did not contain enough value to complete the transaction, the consumer could be redirected to another site, such as by a link to a web portal, and be offered the opportunity to recharge the card or to purchase a new card. The fulfillment of this recharge or repurchase transaction could be done immediately via a credit card payment from the consumer. All of the above steps would also work under the club model, but the consumer would go to the club provider (for example, the Yahoo® website) and ask that additional units be charged to the payment mechanism associated with the club account. Suitable payment mechanisms could include charges to a credit card or debit account, or other transfers via an automated clearinghouse (ACH) transaction. Typically, the club provider may require a minimum recharge or purchase amount to justify a credit card charge. As an incentive, the merchant could be paid a commission for recharge/repurchase transactions generated from their sites, which commission would be included in the settlement process.

A merchant could also increment the value associated with cards as part of an incentive or retention program using minutes that the merchant purchases wholesale. For example, if a consumer played 9 games at 10 units per game, and they received one play for free, this free play would be accomplished by incrementing the card for 10 units. Increments could also be used as an incentive for visiting certain parts of the Internet to view new offers.

At block 206, the card management database provides a master database that contains information on every outstanding P/I card including the amount of available or remaining value units associated with each P/I card. The card management database houses the results of the increment/decrement transactions described above. This infrastructure already exists and operates to support telephone calls placed against pre-paid calling cards, and need only be extended as described above/below to support micropayment transactions authorized and settled against pre-paid calling cards.

At block 207, a card transaction history file or database contains the individual transactions that are generated when a given card is used for either placing telephone calls or conducting micropayment transactions. For placing phone calls, the card transaction history file would contain fields for storing information such as date, time, number dialed, length of call, and number of units spent. For conducting micropayment transactions, this card transaction history file would contain fields for storing information such as date, time, and a merchant identifier. Both types of history file entries would preferably have the ID/PIN associated with them. These entries would be used to allow consumers to check their own usage and also to support the settlement process.

At block 208, the settlement system receives records of card transactions from the card history file as input and generates payments to the merchants corresponding to those transactions. These transactions could be settled at chosen intervals. For example, in a weekly payment mode, the settlement system would input the value units associated with a specific merchant ID and calculate the payment due that merchant by multiplying those value units by the agreed-upon monetary conversion rate for those value units. For example, assuming a conversion rate of $0.05 per value unit, if a merchant's game site accrued 100,000 value units, then the merchant would receive a settlement payment of $5000 dollars. Included in the settlement payment would be any commissions due the merchant for selling value units, and deducted from that payment would be the value corresponding to any incentives given by the merchant.

At block 209, the Web portal can provide a number of functions. The web address of this portal could be pre-printed on every card to notify the consumer which sites accepted the P/I card for micropayment transactions. As discussed in more detail below, the cards could be issued with an associated rating with specific ratings chosen from a system such as G, PG, R and XXX. A card issued with a given rating can be accepted only by sites having the rating on the card or a lower rating. Point-of-sale merchants could only sell XXX cards to consumers of a given age similar to how tobacco and alcohol products are currently sold. At the portal, consumers could buy cards, recharge cards, check balances remaining on a given card, view where value units associated with a given card have been spent (to promote parental control over sites accessed by their children). Visiting consumers can also generate revenue for the entity hosting the web portal by visiting sites advertised on banners posted at the portal. Since consumers at the web portal have money in-hand in the form of the P/I card, and may be pre-dispositioned to spend, these banner ads could command premium advertising rates. The portal could also charge a fee to merchants for managing any incentive, loyalty, or bonus programs operated by the merchant.

Method of Conducting Micropayment Transactions

Figure 1:
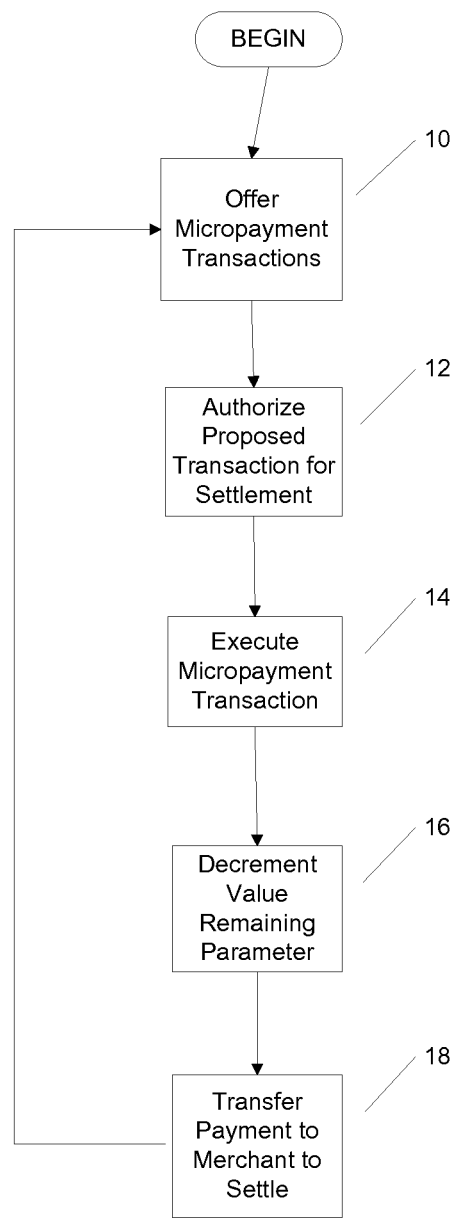
FIG. 1 is a flowchart of the overall processing flow performed by an illustrative embodiment of the method and business method of the invention.

FIG. 1 is a flowchart of the overall processing flow performed by an illustrative embodiment of the method and business method of the invention. The invention provides a method for conducting micropayment transactions between consumers and merchants, and comprises the following steps.

As shown at block 10, a merchant offers micropayment transactions to consumers, during which transactions the merchant provides value to the consumers and the consumers presents data from prepaid calling cards as payment for that value. "Merchant" in the context of this description refers to any provider of good and/or services, and "consumer" refers to any recipient of good and/or services. "Value" in the context of this description refers to any goods and/or services provided by the merchant, and this value may be measured in either monetary or non-monetary terms.

As shown at block 12, a proposed micropayment transaction is authorized for settlement, and at block 14, assuming the proposed micropayment transaction is authorized, the micropayment transaction is executed and completed between the merchant and the consumer, at which time the value changes hands between merchant and consumer. At block 16, a value parameter associated with the prepaid calling card is decremented by an amount corresponding to the value provided by the merchant. At block 18, a payment is transferred to the merchant to settle the micropayment transaction.

Figure 2:
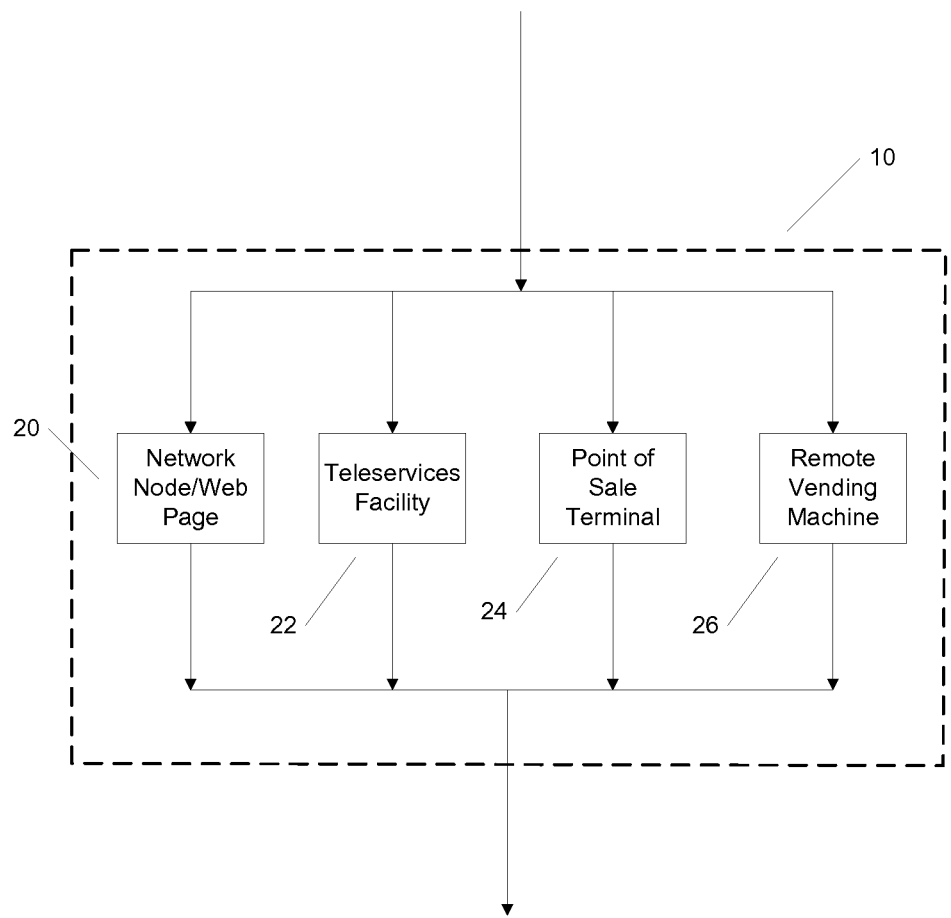
FIG. 2 is a block diagram of the various means by which a merchant can offer micropayment transactions to consumers.

FIG. 2 is a block diagram of various alternatives by which a merchant can offer micropayment transactions to consumers, shown as block 10 in FIG. 1. The merchant may offer these micropayment transactions to prospective consumers using any one or more of the following alternatives, which are shown for example and not to limit the invention. Other alternatives not shown here may be appropriate in given applications. In block 20, the merchant may operate a network node residing on a network that couples the merchant and the consumer. An example network might be a merchant website hosted at a given address on a wide area network such as the Internet or World Wide Web.

As shown in block 22, the merchant might operate a teleservices facility either in-house or outsourced to a third party to handle incoming or outgoing calls from/to consumers. This teleservices facility would be coupled to a public telephone network to which the consumer has access. As shown in block 24, the merchant might also maintain a point-of-sale terminal located at a storefront that enables the consumer to conduct micropayment transactions for any goods and/or services offered by the merchant. In another alternative, as shown in block 26, the merchant might operate a vending machine, such as a drink or snack machine, that is coupled to a wired or wireless communications network to which the consumer has access.

Figure 3:
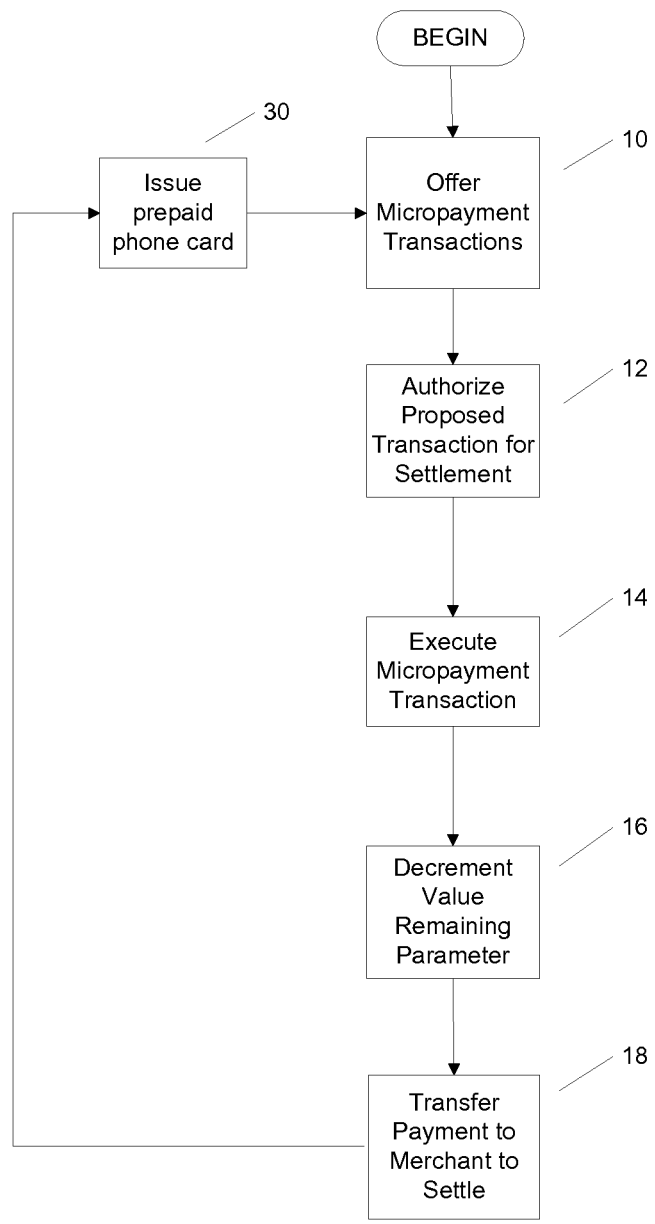
FIG. 3 is a flowchart of the overall processing flow shown in FIG. 1, further illustrating the issuance of prepaid calling cards.
Figure 4:
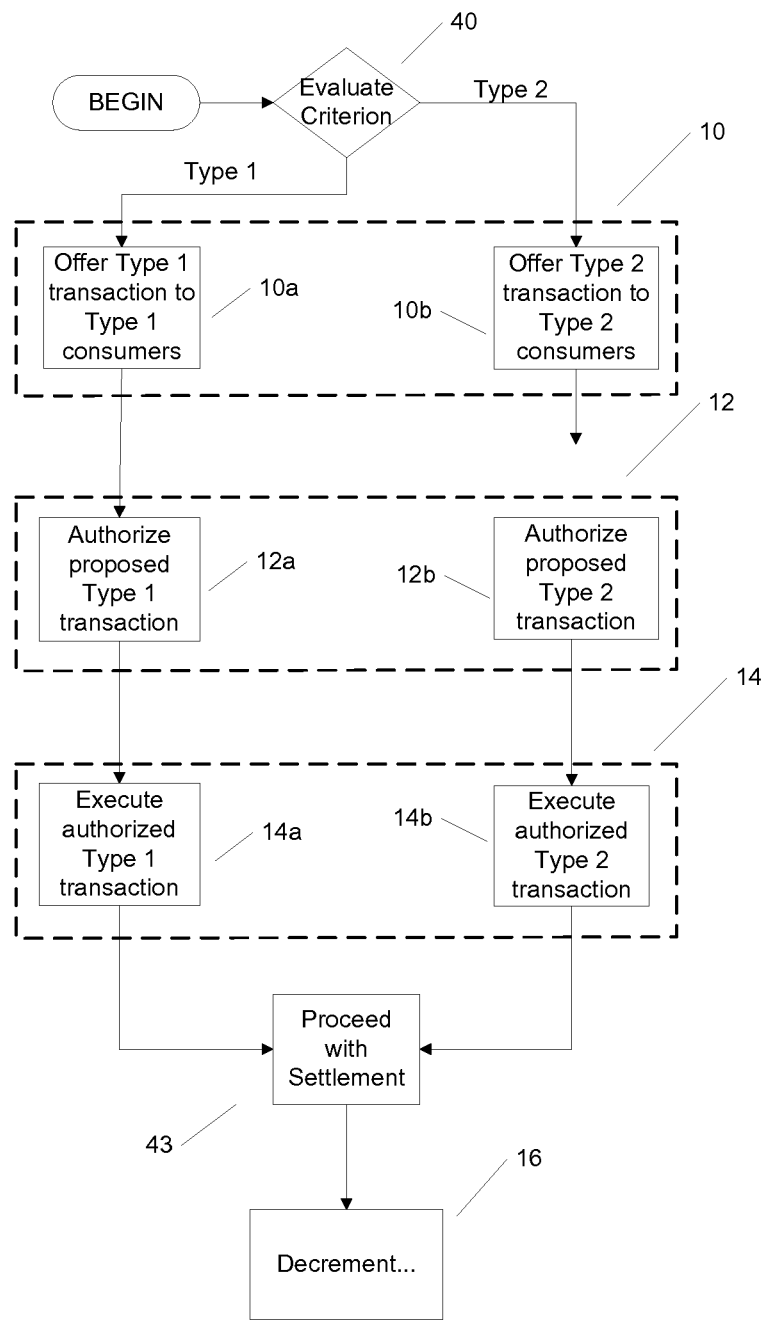
FIG. 4 is a flowchart illustrating additional aspects of the offering step, the authorization step, and the execution step as shown in FIG. 1.

The method of the invention can operate with either conventional pre-paid calling cards as they are known in the art, or the invention can be extended to issuing the cards to consumers, either free of charge or in exchange for a payment from the consumers. See FIG. 3, which is a flowchart of the overall processing flow shown in FIG. 1, illustrating the issuance of prepaid calling cards as initial step 30. FIG. 4 is a flowchart illustrating additional aspects of the offer step 10, the authorization step 12, and the execution step 14 as shown in FIG. 1. Within the scope of the invention, the merchant may offer different types of micropayment transactions to two or more different types of consumers. For example, returning briefly to the website embodiment discussed above, minors may be legally barred from accessing certain gambling, gaming, or other websites. Accordingly, the merchant may restrict access to certain types of transactions based on the age of the prospective consumer. In this example, the merchant offers a first type (adult) of micropayment transactions strictly to a first type (adult) of consumers. As another example, a children's-only card might be offered to enable children to access child-oriented sites. Other examples include issuing prepaid calling cards that enable the consumer to access specific sites or to play specific games on-line.

To support the merchant in the effort to differentiate among prospective consumers, an issuer of pre-paid calling cards can distribute at least two types of prepaid calling cards. Each type of prepaid calling card is associated with respective types of consumers having proper access to respective types of micropayment transactions. As shown at evaluation block 40, the distinction between these two types of cards and micropayment transactions can be made on the basis of age or any other applicable criterion. Age is shown merely for example. The result of evaluation block 40 sends program control either to blocks 10a, 12a, and 14a, or to blocks 10b, 12b, and 14b. At blocks 10a and 10b, the appropriate types of micropayment transactions are offered to the appropriate consumers; at blocks 12a and 12b, the appropriate micropayment transactions are authorized; and at blocks 14a and 14b they are executed and completed with the appropriate consumers. Block 43 gathers program control and passes it back to block 16 in FIG. 1 to proceed with processing the transaction.

While FIG. 4 illustrates two types of transactions and consumers, it should be understood that the scope of the invention includes two or more types or classifications of transactions. Accordingly, the invention is not limited to the embodiment shown in FIG. 4.

Once the prepaid calling card is issued to the consumer, and the infrastructure required to offer the transactions is in place, the merchant and the consumer can execute micropayment transactions. Where different types of micropayment transactions are offered, the type of micropayment transaction sought by the consumer is evaluated or validated (block 40) against the type of prepaid calling card presented by the consumer to ensure that the consumer has proper access to the transaction. This validation step is a preliminary form of transaction authorization, applicable where access to certain transactions is restricted according to the embodiment shown in FIG. 4.

Returning briefly to FIG. 1, once the transaction is underway, it preferably is authorized (step 12) before being allowed to execute to completion (step 14), otherwise the merchant risks being defrauded by accepting a payment from a calling card that has no value associated with it. The steps of authorizing (block 12) and the step of decrementing (block 16) are preferably performed in real-time from the perspective of the consumer and merchant, to avoid frustrating the consumer and/or the merchant, and to prevent duplicate charges from being applied fraudulently against a given remaining card balance. "Real-time" as used in the context of this description refers to a delay while the authorizing and decrementing are performed that does not unduly interfere with the flow of the given transaction. As would be understood by those skilled in the art, this standard will vary depending on the nature and circumstances of the given transaction. For example, a five-second delay while conducting a telephone transaction might be considered real-time, while the same delay during a website transaction might not.

Figure 5:
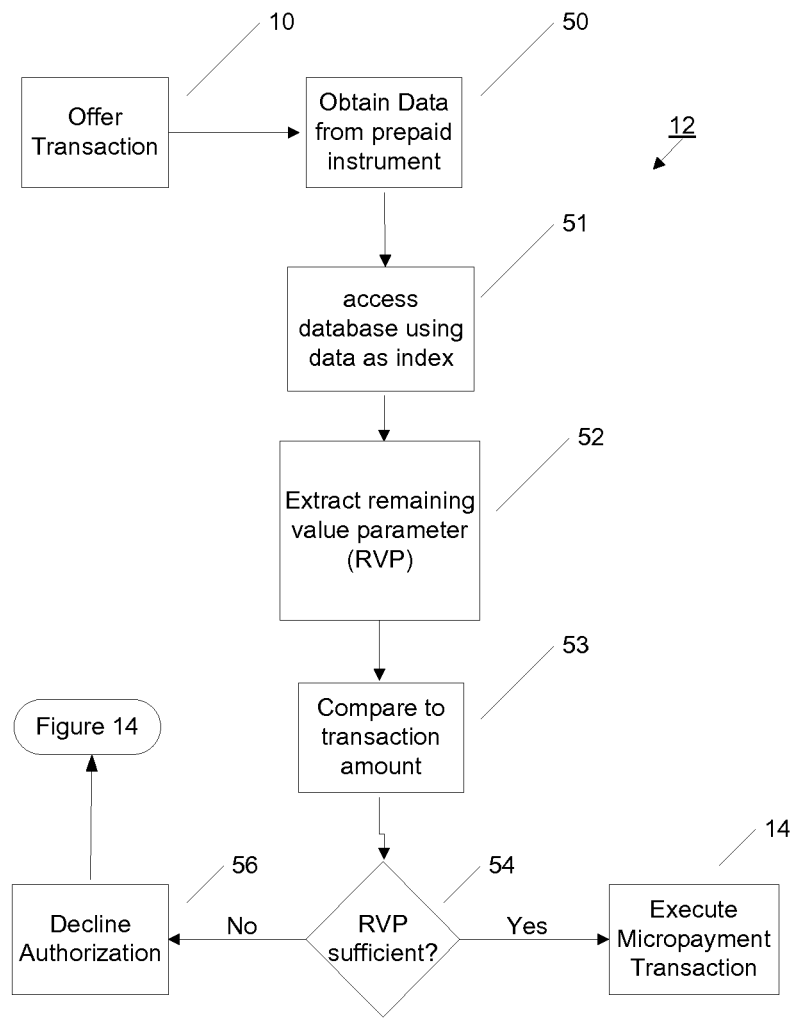
FIG. 5 is a flowchart illustrating additional aspects of the authorizing step shown in FIG. 1.

FIG. 5 is a flowchart illustrating additional aspects of the authorizing step 12 shown in FIG. 1. Typically, as shown in block 50, authorization proceeds with the merchant capturing information or data from the prepaid calling card, such as a prepaid calling card number, PIN, or other data necessary to determine whether the prepaid calling card has value associated with it. As shown in block 51, the merchant accesses a database to retrieve the value parameter associated with the prepaid calling card presented by the consumer, with the data captured from the prepaid calling card serving as an index into the database.

Figure 6:
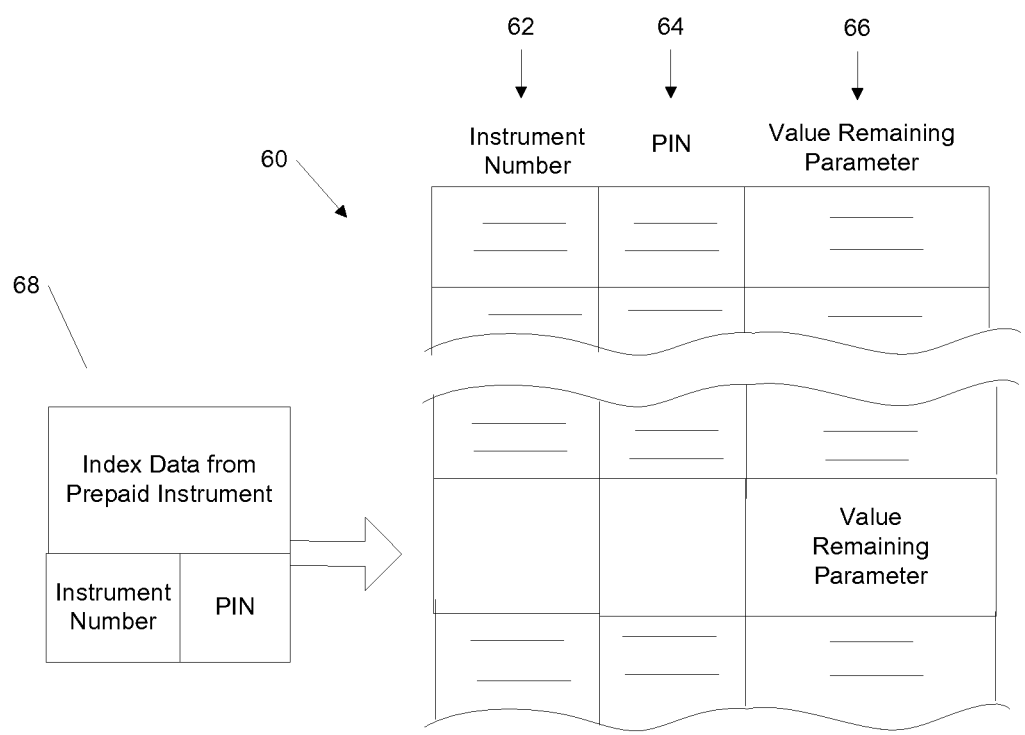
FIG. 6 is a block diagram of an illustrative structure of a database supporting the authorization step shown in FIG. 1.

FIG. 6 is a block diagram of an illustrative structure of a database 60 supporting the authorization step 12 shown in FIG. 1. The database 60 as shown includes calling card number field 62, PIN field 64, and value remaining parameter field 66. The clearinghouse 74 receives data 68 extracted from calling card 73 presented by consumer 76. Data 68 typically includes the prepaid calling card number 62 and the PIN field 64. The clearinghouse 74 accesses the database 60 using the data 68 from the prepaid calling card 73 as an index into the database 60 to obtain the remaining value parameter 66 associated with the prepaid calling card 73. The clearinghouse 74 compares the remaining value parameter 66 to the unit value to be settled to the merchant 72, converting as necessary to gain equivalency between the two values being compared. This unit value corresponds to the value of the goods/services provided by the merchant 72 during the micropayment transaction. However, this value need not be the exact amount tendered by the merchant 72, depending on the business arrangements negotiated between the merchant 72 and the clearinghouse 74. The clearinghouse 74 will either determine that the remaining value parameter 66 is sufficient to approve the micropayment transaction for settlement, or determine that the remaining value parameter 66 is insufficient to approve the micropayment transaction for settlement and decline settlement accordingly. As noted above, if the transaction is declined, the consumer 76 can be offered the opportunity to recharge the prepaid calling card 73, or purchase a new one.

Returning to FIG. 5, once the appropriate entry in the database is located using the index, the field entries corresponding to that entry are extracted, as shown in block 52. The field entry of main interest is the value remaining parameter associated with the prepaid calling card, which indicates how many units of value are associated with the prepaid calling card, and whether the proposed micropayment transaction can be authorized In block 53, the merchant, or an entity or process acting on behalf of the merchant, compares the value provided by the merchant to the value parameter associated with the prepaid calling card, as shown by the database, to authorize or decline the micropayment transaction. As shown in block 54, if the value parameter associated with the prepaid calling card is sufficient to cover the payment sought by the merchant, then the micropayment transaction is authorized and execution of the micropayment transaction proceeds (block 14). Otherwise, if the value parameter remaining on the prepaid calling card is insufficient to cover the micropayment transaction for settlement, the micropayment transaction is declined (block 56). At this point, the proposed transaction can be terminated, or the consumer can be given an opportunity to "recharge" his/her prepaid calling card with additional value or to purchase a new prepaid calling card. For example, if the merchant is operating a web page, the consumer might be redirected to a webpage offered by the issuer to either recharge or repurchase.

Returning to FIG. 1, if the authorization step 12 approves or clears the transaction for execution and eventual settlement, the transaction executes and closes (block 14), and the value parameter associated with the prepaid calling card is decremented by an amount corresponding to the value provided by the merchant (block 16). Where the transaction is conducted using a first unit of value, and a second unit of value is associated with the prepaid calling card, it is necessary to exchange or convert the transaction unit of value into the unit of value associated with the prepaid calling card. For example, the value associated with prepaid calling cards may be measured in units of currency, in units of phone time or in generic units of value that can be converted to time or currency equivalents by using negotiated conversion factors. If the value of the micropayment transaction is measured in dollars and the value remaining on the calling card is measured in minutes, then a conversion factor must be applied to settle the micropayment transaction against the prepaid calling card. The precise conversion factor applied is typically negotiated among the prepaid calling card issuer, the merchant, and the clearinghouse that ultimately settles the transactions. However, these conversions may not necessarily be time-to-money conversions; if the prepaid calling card and the micropayment action are measured in different currencies, one must be converted into the other to settle the transaction.

Advantages

The invention as described herein offers several key advantages to consumers. First, it provides an alternative avenue that enables consumers to expend unused value associated with their cards or instruments, rather than allowing that value to expire worthless. Should the consumers not wish to place phone calls, he/she can extract that value by conducting micropayment transactions for goods/services. Second, the consumers can freely transfer the card or instrument to another while exposing himself/herself to only limited liability. Specifically, any liability associated with such transfers is limited to the remaining value associated with the card or instrument. In contrast, transferring a credit card could expose the transferor to liability up to the credit limit of the card. Third, consumers of prepaid instruments or calling cards may transfer unused value associated with their cards to brokerages, possibly for consideration depending on the amount of value left on such cards. The brokerages could in turn transfer this unused value to other consumers. Fourth, conducting transactions using the instruments/cards provided according to the invention can provide the consumer with a much greater degree of anonymity than would credit cards, debit cards, or Smart Cards.

The invention also provides advantages to merchants. First, consumers may hesitate to provide credit card numbers over networks, such as the Internet or the public telephone network. However, the alternative payment avenue provided by the invention may enable the merchant to reach those reluctant consumers by lowering the risk faced by those consumers. Therefore, the merchant can expand its consumer base because more visiting consumers become purchasing consumers. Second, the merchant is virtually assured of payment (as discussed more fully below), thereby reducing or eliminating collection issues related to bad debt or fraudulent transactions.

Another significant advantage of the invention is that the given micropayment transaction can be executed without the consumer even having physical possession of the prepaid calling card during execution of the micropayment transaction. Indeed, the issuer of the card need not even issue a physical card to the consumer. The issuer could send the card number and PIN to the consumer via e-mail, for example. For example, if the consumer has memorized the telephone access number and PIN, he/she can provide the data from his/her own memory to authorize/execute the micropayment transaction without producing the card. In contrast, if the methods discussed above in the Background are employed (Smart Cards, credit cards, debit cards, or the like), the consumer typically must produce the physical card itself to have the card read and processed by specialized, expensive hardware such as card readers and scanners. However, the invention avoids this expensive hardware by capitalizing on the largely existing infrastructure that currently processes prepaid calling cards. In most cases, the method of the invention can execute a given micropayment transaction without machine access to any data physically residing on the prepaid calling card.

Another significant advantage of the method of the invention is lower per-transaction costs. As also discussed above in the Background, Smart Cards, credit cards, debit cards or the like are typically not suitable for conducting micropayment transactions because the per-transaction costs associated with such cards tends to exceed the relatively small value exchanged or the profit margin of the merchant during a micropayment transaction. Two main factors drive the high transaction costs associated with these cards. First, the risk of fraud, and the considerable cost of unwinding transactions involving fraudulent use of such cards, is factored into per-transaction cost. Second, assuming the consumer presenting the card is authorized to use the card, there remains the risk that that person will default on his/her obligation to repay the bank that issued the card. This bad debt risk is similarly factored into the per-transaction cost, typically surfacing in the interchange fees charged by banks Settling micropayment transactions to prepaid calling cards reduces per-transaction cost by avoiding both of the above factors. First regarding fraud risk, prepaid calling cards as issued are associated with a limited, relatively small quantum of value, especially as compared to credit cards or debit cards. Even if the prepaid calling card is stolen or lost, the risk of fraud is capped at the relatively low maximum value (in either currency or calling time) associated with the card. In contrast, should a credit card be stolen or lost, the risk of fraud is capped only by a relatively high credit limit associated with the card. While, as noted above, the consumer or other legitimate holder of the credit card may not face this full risk, the issuing bank and merchant most likely do and this risk is factored into the issuing bank's cost of doing business. In the case of debit cards, the risk of fraud is capped only by the extent of funds on deposit in the account to which the debit card is linked. Thus, while the fraud risk associated with credit/debit cards is significant and possibly indefinite, the fraud risk associated with prepaid calling cards is definite and fixed at a relatively low level.

Second, regarding bad debt or credit risk, prepaid calling cards avoid this risk altogether because of the intrinsic nature of how they are issued and sold. There is no risk of bad debt because there is no debt that can go bad; the funds against which the micropayment transaction is to be settled were collected from the consumer when he/she bought the prepaid calling card. Those funds are on deposit with either the entity that sold or issued the prepaid calling card, or another intermediary. Because the risk of fraud is minimal and the risk of bad debt is virtually non-existent with prepaid calling cards, they offer the low per-transaction costs that are essential to conducting micropayment commerce.

Once the transaction is authorized and completed, a payment is transferred to the merchant to settle the micropayment transaction, as shown in block 18 of FIG. 1. If the entity that originally issued and sold the prepaid calling card to the consumer still holds the consumer's payment, then the micropayment transaction can be settled by routing a payment from the issuing entity directly to the merchant. However, a third party clearinghouse or other intermediary may be responsible for tracking usage and ownership of the prepaid calling card, or otherwise is holding the funds originally paid for the prepaid calling card. In this case, the micropayment transaction can be settled by routing a payment from that third party clearinghouse either directly or indirectly to the merchant.

To reduce per-transaction costs, the method of the invention can aggregate multiple micropayment transactions involving prepaid calling cards issued by a given calling card issuer into a composite settlement transaction to be settled against the given calling card issuer, or against a given clearinghouse. See discussion of FIG. 9 below in the System Implementation section. This enhancement reduces per-transaction costs by processing transactions logged against a given issuer or clearinghouse in bulk rather than piecemeal. To reduce per-transaction costs even farther, the invention can aggregate multiple micropayment transactions involving prepaid calling cards issued by a given calling card issuer and involving a given merchant into a composite settlement transaction to be settled against the given calling card issuer to the given merchant.

System Implementation

Figure 7:
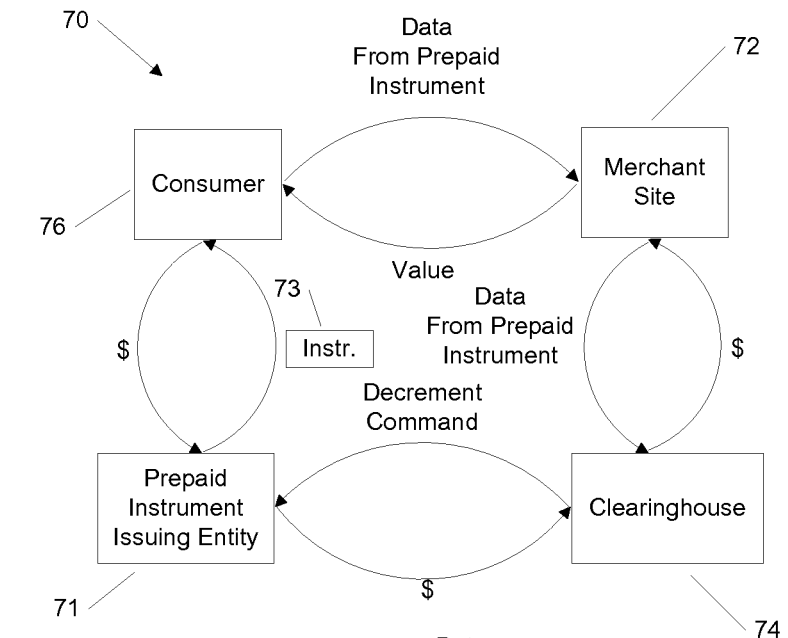
FIG. 7 is a block diagram of a system constructed according to an illustrative embodiment of the invention.

FIG. 7 is a block diagram of a system 70 provided to conduct micropayment transactions between consumers 76 and merchants 72 according to an illustrative embodiment of the invention. The system 70 comprises the following.

At least one prepaid calling card 73 is issued to a consumer 76, who may purchase the prepaid calling card 73 or who may receive the prepaid calling card 73 for free as a demonstration item or promotion sponsored by a merchant 72 or an issuing entity 71. The issuing entity 71 can issue the prepaid calling cards 73 to consumers 76 in exchange for payments from the consumers 76. The funds resulting from these purchases can be held on deposit either by the issuing entity 71, or by another entity acting on behalf of the issuing entity 71.

The issuing entity 71 can issue at least two different types of prepaid calling cards 73 to at least two different types of consumers 76. Specifically, as discussed above in connection with FIG. 4, the issuing entity 71 can issue at least two types of prepaid calling cards 73 to at least two different types of consumers 76 based on the age of the consumers 76, or other applicable criteria, as discussed above. In this manner, for example, a parent could control which micropayment transactions a child could access, by regulating which type of card the parent provides the child.

A merchant or merchant site 72 conducts micropayment transactions with consumers 76 and accepts the prepaid calling card 73 as payment for the micropayment transactions. During these transactions, the merchant provides value to the consumer 76 and the consumer 76 presents data from a prepaid calling card 73 as payment for the value to have a proposed micropayment transaction authorized for settlement. The specific type of merchant site 72 offered to consumers 76 can include the examples illustrated in FIG. 2 and discussed above.

Turning to the FIG. 4 embodiment, wherein pre-paid calling cards 73 and offered transactions are classified, the merchant site 72 offers at least two types of micropayment transactions to respective types of consumers 76 based on, for example, the age of the consumers 76 or other criteria. A first type of micropayment transaction can be offered strictly to a first type of consumers 76, depending on the criteria chosen for differentiation. By checking the type of prepaid calling card 73 presented by the consumer 76, the merchant site 72 can validate whether a given micropayment transaction is appropriate for a given consumer 76, thereby helping to prevent improper consumer access to micropayment transactions.

The merchant site 72 accepts data from the prepaid calling card 73 to be used to settle the micropayment transaction. Typically, this data includes the data necessary to enable the micropayment transaction to be authorized and settled against the remaining value associated with the prepaid calling card 73 presented by the consumer 76. In most applications, the prepaid calling card number and PIN associated with the prepaid calling card will suffice.

As discussed above, the merchant site 72 can execute the given micropayment transaction without the consumer having physical possession of the prepaid calling card. If the consumer has memorized the access number and PIN, then the consumer need not physically possess the prepaid calling card. Further, the merchant site can be adapted to execute a given micropayment transaction without machine access to any data physically residing on the prepaid calling card, if the consumer can recite the access number and PIN from memory. This advantage can be beneficial if a prepaid calling card having value remaining on it is lost or misplaced, in that the consumer can still use it to conduct micropayment transactions. This advantage also avoids the expense associated with Smart Cards or other cards having on-board processing chips, memory, and/or magnetic strips, and also eliminates the need to employ hardware such as card or magnetic strip readers at the merchant locations. In the context of Web transactions, the retail consumer need not have such hardware connected to his/her personal computer to conduct micropayment transactions, which is a key advantage the invention provides especially as compared to Smart Cards.

Figure 8:
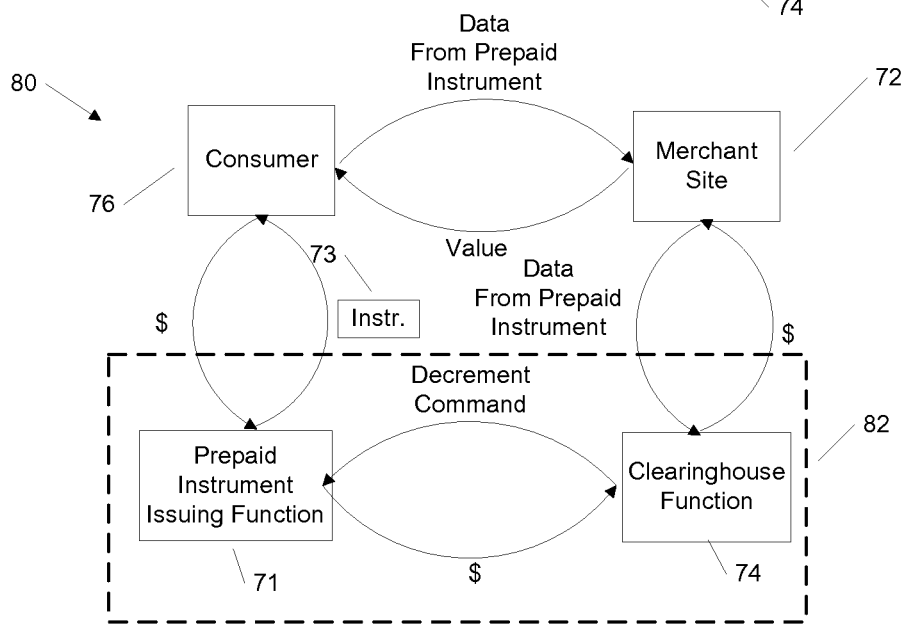
FIG. 8 is a block diagram of a variation of the system shown in FIG. 7 constructed according to an alternate embodiment of the invention.

A clearinghouse 74 receives data associated with the prepaid calling card 73 from the merchant site 72, and processes the data to settle the micropayment transaction. According to various embodiments of the invention, the issuing entity 71 can be separate from the clearinghouse 74 (FIG. 7), or the issuing entity 71 can be functionally integrated into the clearinghouse 74 (FIG. 8). In both the FIG. 7 and FIG. 8 embodiments, the funds resulting from any sale of the prepaid calling card may be held on deposit with either the issuing entity 71 or the clearinghouse 74. The FIG. 8 embodiment might be appropriate, for example, where one given business entity decides both to issue and to administer a prepaid calling card 73. This card 73 might be a special-purpose card created, branded, and promoted specifically to practice the invention, or a general-purpose card used to practice the invention.

If the clearinghouse 74 authorizes or approves the transaction, the clearinghouse 74 can transfer a payment to the merchant 72 to settle the transaction. If the clearinghouse 74 holds the settlement funds, it can originate the payment to the merchant 72. If the settlement funds, which may be the funds originally paid by the consumer 76 to purchase the prepaid calling card, are still held by the issuing entity 71, the clearinghouse 74 can order a payment from the issuing entity 71 directly or indirectly to the merchant 72. On the other hand, if another third party holds the settlement funds, the clearinghouse 74 can order that a settlement payment be sent indirectly to the merchant 72 through at least one intermediary.

Figure 9:
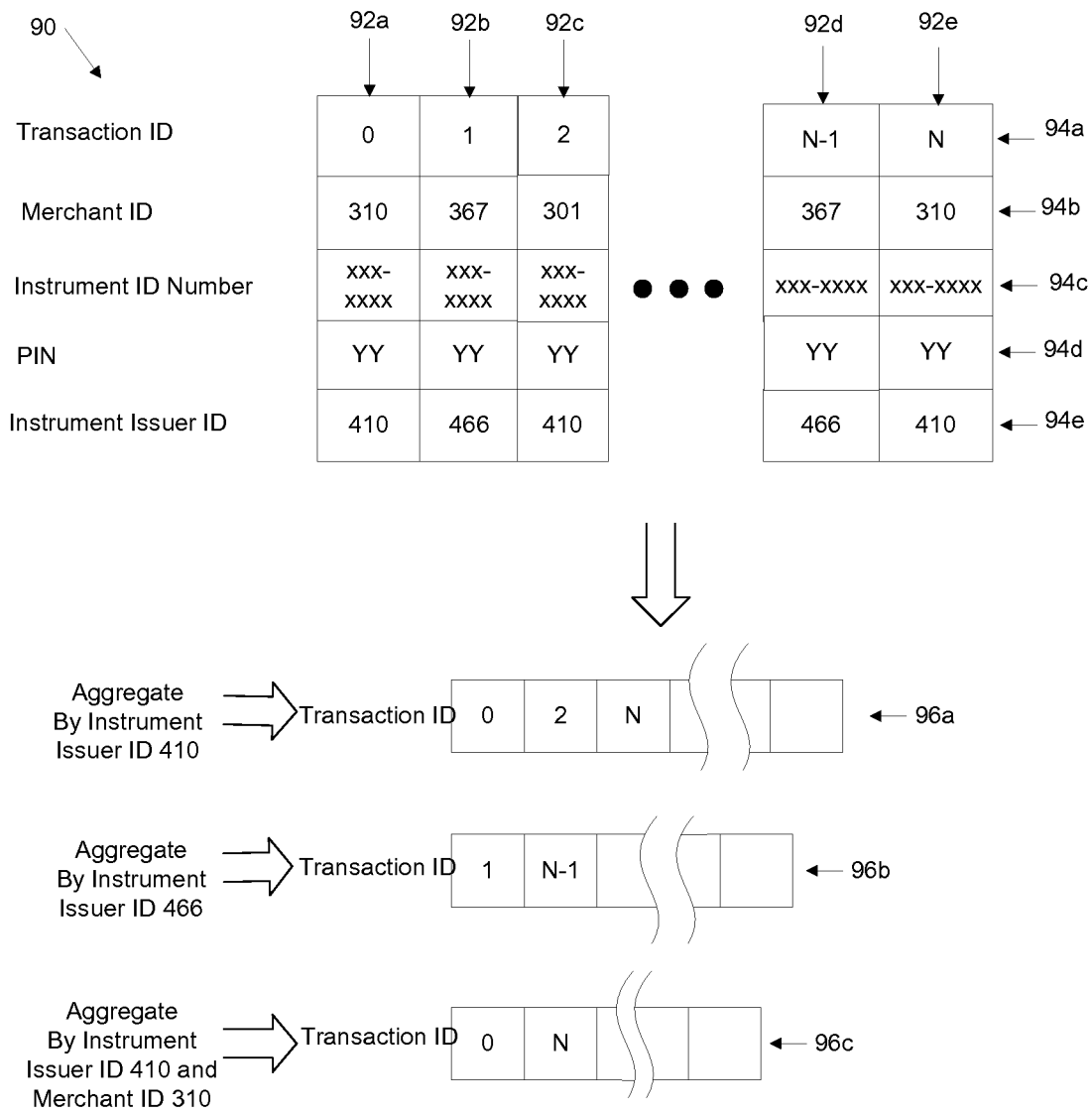
FIG. 9 is a block diagram of an example data structure supporting the settlement step as shown in FIG. 1.

FIG. 9 is a block diagram of an illustrative data structure 90 supporting the settlement step 18 shown in FIG. 1. Respective transactions to be settled are represented by columns 92*a*, 92*b*, 92*c*, 92*d*, and 92*e*. The data structure contains rows for various data relevant to each transaction, such as a transaction ID field 94a, a merchant ID field 94b, a prepaid calling card number field 94c, a PIN field 94d, and an issuer ID field 94e. Data structure 90 as shown in FIG. 9 is populated with sample data chosen strictly for illustration, and not to limit the invention.

To maximize efficiency during the settlement process, and to minimize per-transaction cost, the clearinghouse 74 can use fields 94a-94e to group multiple micropayment transactions 92a-92e into aggregated settlement transactions 96a and 96b involving prepaid calling cards issued by a respective calling card issuer. Aggregated settlement transactions 96a and 96b can then be settled in bulk against the given calling card issuer 71, or whoever else holds the settlement funds.

As a further optimization, the clearinghouse 74 can group multiple micropayment transactions 94a-94e not only by the calling card issuer 71, but also by the merchant 72 receiving settlement, into aggregated transactions. This optimization streamlines the settlement process based not only on the source of the settlement funds, but also on the recipient of the settlement funds. By settling these aggregated transactions in bulk rather than piecemeal against the given calling card issuer 71, the lower cost of settling the bulk transaction is spread among the several transactions comprising the bulk, thereby lowering the per-transaction settlement cost. The invention also contemplates allowing unsettled transactions to accumulate after execution until enough have accumulated to allow aggregating them in the most cost-efficient manner, so as to minimize per-transaction settlement costs.

FIGS. 6 and 9 illustrate non-limiting embodiments of data structures suitable for practicing the invention. However, it will be understood that the logical layout, record and field format, variable names and the like may be varied by those skilled in the art without departing from the scope of the invention.

Business Method

Figure 10:
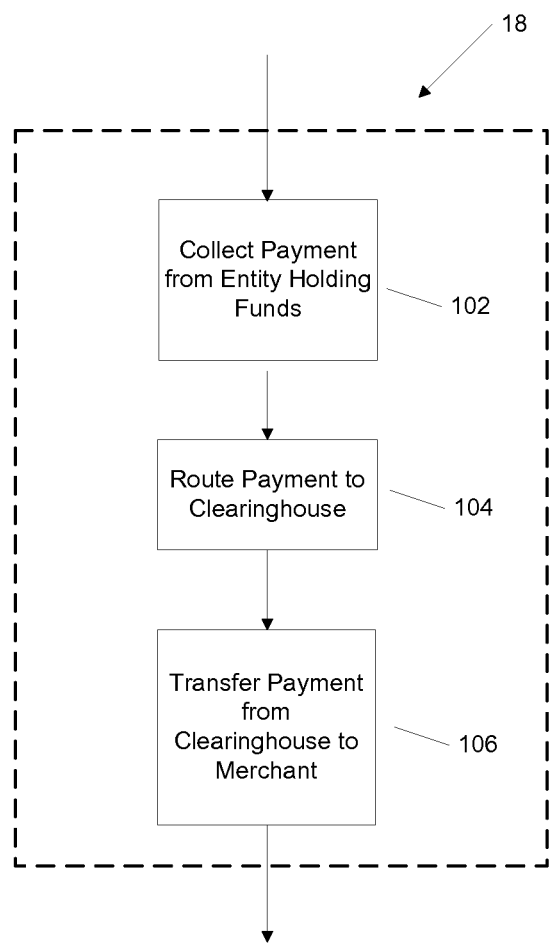
FIG. 10 is a flowchart illustrating processing specific to the business method of the invention, especially various aspects of the settlement step 18 shown in FIG. 1.

FIG. 10 is a flowchart illustrating processing specific to the business method of the invention, especially various aspects of the settlement step 18 shown in FIG. 1. Steps 10, 12, 14, and 16 remain as illustrated in FIGS. 1-10 and as discussed above.

Returning briefly to FIG. 1, a merchant 72 offers at least one micropayment transaction to a consumer 76, during which transaction the merchant 72 provides a first value to the consumer 76 and the consumer 76 presents data from a prepaid calling card 73 as payment for the first value (step 10). A proposed micropayment transaction, and a corresponding decrement of a value parameter associated with the prepaid calling card between the merchant 72 and consumer 76 is authorized (step 12), and the micropayment transaction is executed (step 14). The value parameter is decremented by the first value (step 16).

Turning to FIG. 10, in step 102, a payment having a second value is collected from an entity holding the settlement funds, which may be issuing entity 71, who issued the prepaid calling card 73 to the consumer 76. Alternatively, the payment can be collected from another entity holding the settlement funds on behalf of the issuing entity 71. Typically, when the consumer initially purchases the prepaid calling card 73, he or she pays considerably more than the first value exchanged between the merchant 72 and the consumer 76 during the micropayment transaction, but this need not necessarily be the case. In any event, the first value should be greater than the second value, thereby generating a first profit to the issuing entity 71 equal to the difference between the first value and the second value.

After the payment is collected from the issuer 71 or other fund-holding entity, it is then routed to a clearinghouse entity 74 to facilitate settling the micropayment transaction, as shown in block 104. The exact relationship between the first value and the second value, and thus the profit netted by the issuer 71 or other fund-holding entity, is negotiated between that entity and the clearinghouse 74.

As shown in block 106, the clearinghouse 74 then transfers a payment having a third value to the merchant 72 to settle the micropayment transaction. The second value should be greater than the third value, thereby generating a second profit to the clearinghouse entity 74 equal to the difference between the second value and the third value. The exact relationship between the second value and the third value is negotiated between the clearinghouse 74 and the merchant 72.

Figure 11:
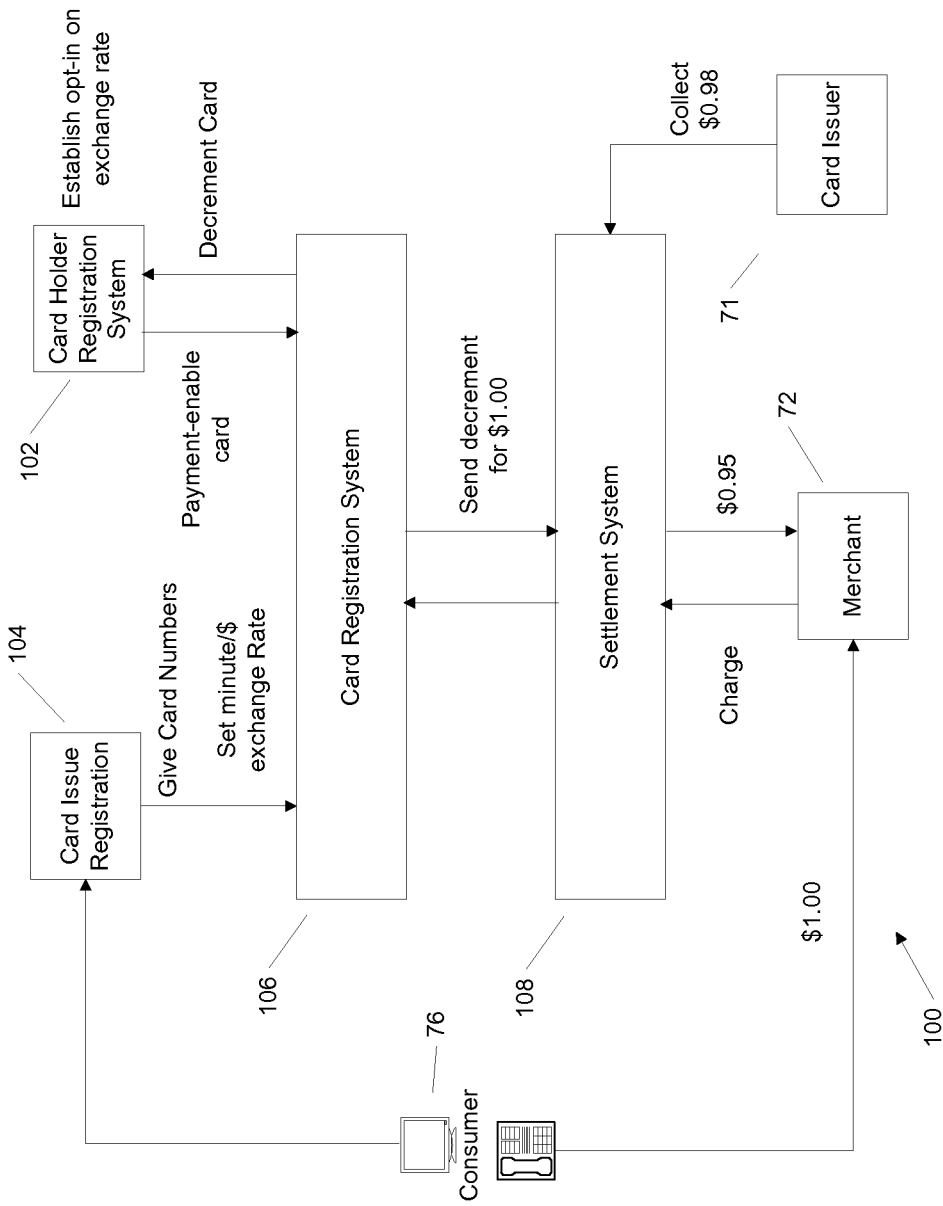
FIG. 11 illustrates an example micropayment transaction conducted between consumers and merchants in accordance with the invention.

FIG. 11 illustrates an example micropayment transaction conducted between consumers 76 and merchants 72 in accordance with the invention. A card issue registration entity 104 generates card numbers, associates a first time/currency exchange rate associated with the card numbers at the time of generation, and feeds those numbers and rates into a card registration system 106. The first time/currency exchange rate is determined by dividing the minutes on a given card by the purchase price of the card. A card holder registration system 102 tracks the value remaining on each prepaid calling card and authorizes decrements on prepaid calling cards where the value remaining is greater than the value sought to be settled. Card registration system 106 serves as an interface to both card issue registration entity 104 and card holder registration system 102. Settlement system 108 interfaces with the issuing entity 71, merchant site 72, and the card registration system 106. Issuing entity 71 has access to the card numbers generated by card issue registration entity 104, and manufactures and sells the prepaid calling cards.

In the example transaction illustrated, consumer 76 has purchased a prepaid calling card from issuing entity 71, who we assume still holds the funds resulting from that purchase. The consumer 76 then submits a proposed micropayment transaction for $1.00 US of goods/services with merchant site 72. Merchant site 72 sends a request to authorize the proposed transaction to settlement system 108 and awaits the result. Settlement system 108 forwards the request to card registration system 106, who in turn checks the time/currency conversion ratio associated with the prepaid calling card as obtained from card issue registration entity 104. The time/currency conversion ratio determines how much time must be deducted from the consumer's prepaid calling card to settle the transaction. Settlement system 108 makes this calculation and sends to card registration system 106 a request to decrement the consumer's prepaid calling card by the calculated amount. Accordingly, card registration system 106 forwards to cardholder registration system 102 a request to authorize decrementing the prepaid calling card by the amount of time that corresponds to $1.00 US of monetary value.

Cardholder registration system 102 authorizes this decrement request by examining the value remaining on the prepaid calling card. To authorize this request, the card holder registration system 102 may employ a second minute/dollar conversion ratio, which may or may not be the same as the first minute/dollar conversion ratio defined by card issue registration entity 104. If the proposed transaction is authorized, card holder registration system 102 decrements the prepaid calling card and sends a payment enable command to card registration system 106, who in turn relays this command to settlement system 108. The proposed transaction is now authorized and is allowed to execute to completion. The next step is settlement, which may or may not occur immediately after the transaction completes. At settlement time, the card issuer 71 forwards, for example only, $0.98 to the settlement system 108. The forwarding of $0.98 results in a $0.02 profit for the card issuer 71, since it received, on a pro rata basis, $1.00 from the consumer 76 when he/she purchases the prepaid calling card. Settlement system 108 then forwards $0.95, for example only, to the merchant 72 to settle the $1.00 transaction with consumer 76. In this example, the net effect of settlement to the merchant 72 is a nominal $0.05 loss, which may be considered the transaction cost associated with conducting the micropayment transaction with consumer 76. However, the merchant can adjust the retail price of his goods/services relative to his wholesale cost so as to offset the $0.05 transaction cost associated with the transaction thereby generating a net profit nevertheless.

Method of Settling Micropayment Transactions

Figure 12:
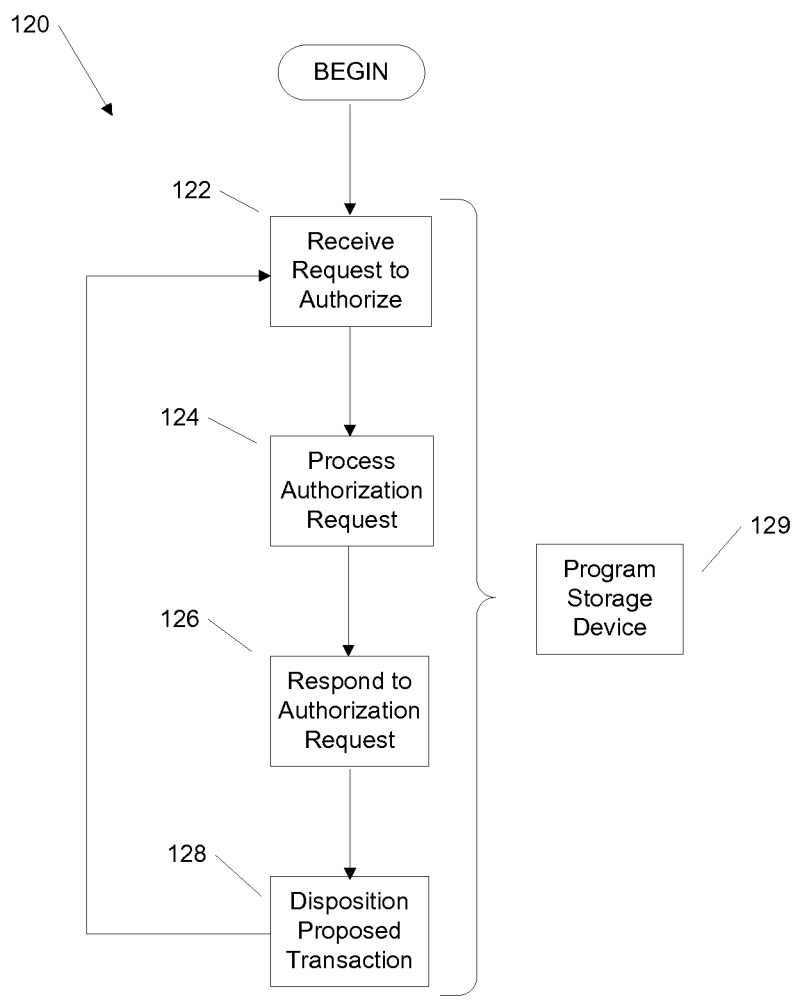
FIG. 12 is a flowchart illustrating a method of settling a micropayment transaction conducted between a consumer and a merchant using a prepaid calling card presented by a consumer.

FIG. 12 is a flowchart illustrating a method 120 of settling a micropayment transaction conducted between a consumer 76 and a merchant 72 using a prepaid calling card 73 presented by a consumer 76. In an illustrative embodiment, the method 120 comprises the following steps. As shown in block 122, a request is received from the merchant 72 to authorize a proposed micropayment transaction for a first value. In block 126, the authorization request is processed. Depending on the result of this processing, the method responds to this authorization request by providing an authorization decision, as shown in block 126. The proposed micropayment transaction is then dispositioned as shown in block 128.

The step 122 of receiving a request can include receiving data including at least a calling card number and a PIN associated with the prepaid calling card 73, along with a predefined command representing an authorization request, and the transaction value to be authorized. However, if the consumer 76 obtained the prepaid calling card 73 through a club membership, then this data may include a club identifier associated with such club. The step 124 of processing the authorization request can include, for example, the processing flow illustrated in FIG. 5 at blocks 50, 51, and 53, and as described in the text accompanying that figure.

Figure 12A:
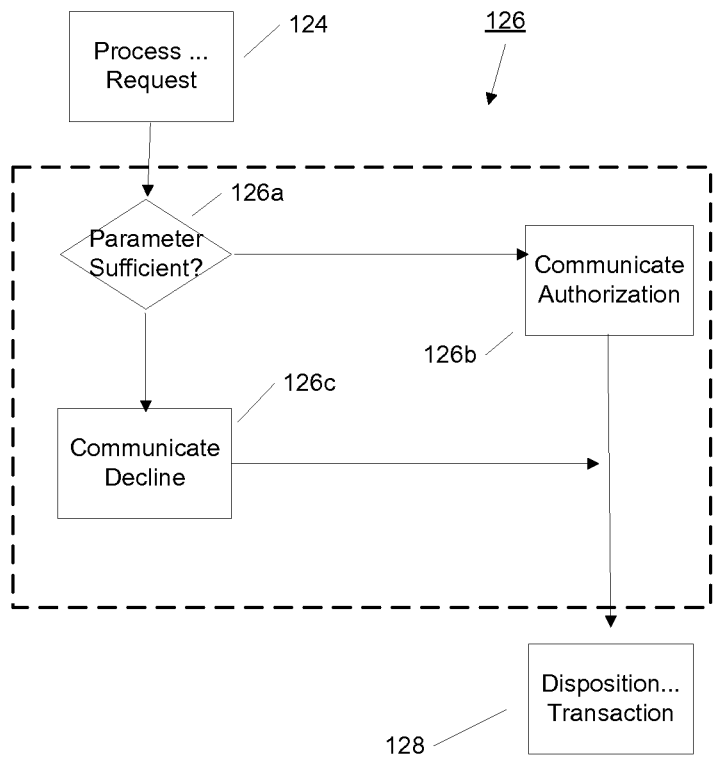
FIG. 12A is a flowchart illustrating a processing flow performed during the response step illustrated in FIG. 12

FIG. 12A is a flowchart illustrating a processing flow performed during the response step 126 illustrated in FIG. 12. At evaluation block 126a, the method determines whether the value remaining parameter is sufficient to authorize the micropayment transaction requested in block 122. If the value remaining parameter is sufficient, then the method communicates an authorization message to the requesting process, and the transaction proceeds to disposition step 128. Otherwise, the method communicates a decline message to the requesting process, and the transaction proceeds to disposition step 128.

Figure 13:
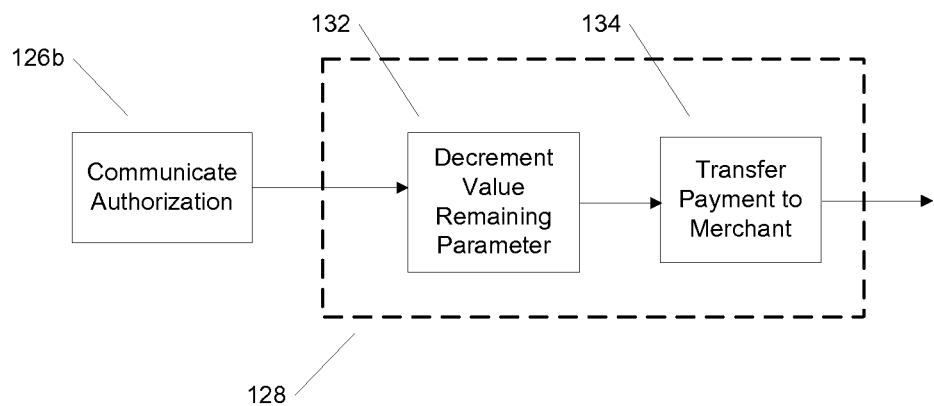
FIG. 13 is a flowchart illustrating a first processing flow performed during the dispositioning step shown in FIGS. 12 and 12A.

FIG. 13 is a flowchart illustrating a first processing flow performed during the dispositioning step 128 shown in FIGS. 12 and 12A. If the transaction is authorized as shown in block 126b of FIG. 12A, then the value remaining parameter is decremented in block 132, and the transaction is settled by transferring a payment to the merchant as shown in block 134.

Figure 14:
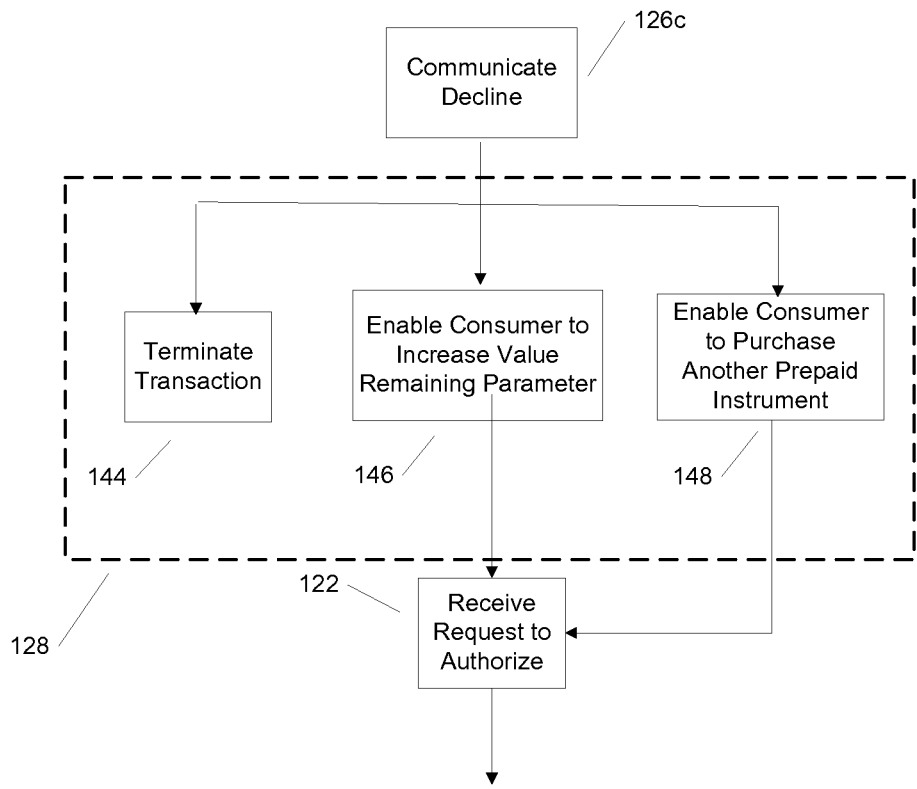
FIG. 14 is a flowchart illustrating a second processing flow performed during the dispositioning step shown in FIGS. 12 and 12A.

FIG. 14 is a flowchart illustrating a second processing flow performed during the dispositioning step 128 shown in FIGS. 12 and 12A. If the value remaining parameter is less than the first value, then the response step 126 communicates a decline message, as shown in block 126c. In this case, the step 128 of dispositioning the micropayment transaction can include terminating the micropayment transaction, as shown in block 144. A second alternative shown in block 146 is to enable the consumer to recharge the prepaid calling card by increasing the value remaining parameter after the micropayment transaction has been declined for settlement. A third alternative, shown in block 148, is to enable the consumer to purchase a second prepaid calling card having a second value remaining parameter greater than the first value.

According to various aspects of the invention, the enabling steps 146 and 148 can be performed by software hosted on a merchant website, or by software hosted by a settlement clearinghouse. After the value remaining parameter has been increased by the consumer either recharging the prepaid calling card or purchasing a new prepaid calling card, the merchant can submit a second request to authorize the proposed micropayment transaction, as shown in block 149.

The step of processing can include exchanging between a unit of value used to conduct the micropayment transaction and a unit of value associated with the prepaid calling card. The step of exchanging can include converting between units of time and units of monetary currency, or converting between two different units of monetary currency. Preferably, the steps 124 and 126 of processing and responding are performed in real time.

As discussed above, the step of transferring a payment can include originating the payment either directly or indirectly to the merchant from an issuing entity that issued the prepaid calling card to the consumer. More generally, the settlement payment can originate with any entity holding the settlement funds, whether that entity be the entity that originally issued the prepaid calling card, a settlement clearinghouse that holds the settlement funds on deposit, or any other third party that holds the funds.

The step of transferring a payment can include aggregating multiple micropayment transactions involving prepaid calling cards issued by a given calling card issuer into a composite settlement transaction to be settled against the given calling card issuer. This step can be extended to include aggregating multiple micropayment transactions involving prepaid calling cards issuer and involving a given merchant into a composite settlement transaction to be settled against the given calling card issuer.

Figure 15:
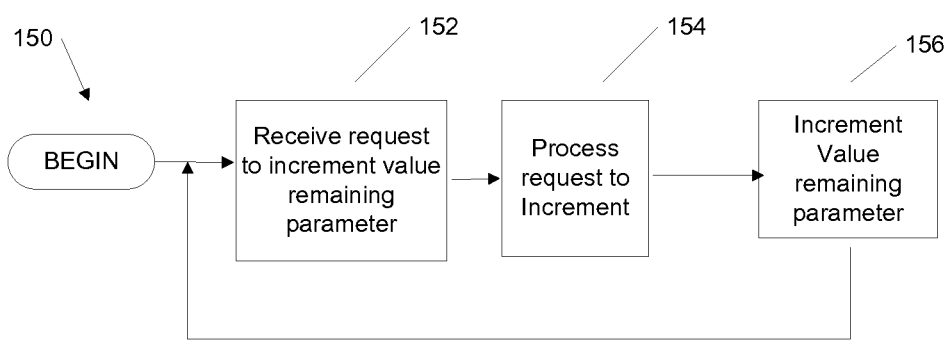
FIG. 15 is a flowchart illustrating processing flow executed while the invention processes a request to increment the value remaining parameter associated with a given prepaid calling card.

FIG. 15 is a flowchart illustrating a processing flow 150 executed while the method of the invention processes a request to increment the value remaining parameter associated with a given prepaid calling card. According to various embodiments of the invention, the merchant can request the clearinghouse to increment the value remaining parameter of a prepaid calling card presented by a given consumer, as shown at block 152. For example, if the consumer conducts a specified type of transaction on a website associated with the merchant, then the merchant might submit such a request. Continuing this example, the merchant website might host a gaming application, and if the consumer transacts with the gaming application and achieves a score that reaches a threshold, the consumer might earn bonus value units to be applied to his/her prepaid calling card.

The merchant website might set the bonus threshold statically at some predetermined value that applies uniformly to all consumers accessing the website. Alternatively, the merchant website might set this bonus threshold dynamically for a given consumer depending on parameters associated with that given consumer. For example, under the terms of a loyalty or incentive program offered by the merchant, the bonus threshold for consumer A might be a score of 1000, while the bonus threshold for consumer B might be a score of 10,000.

Accordingly, the merchant would request that a corresponding increase be applied to the value remaining parameter associated with the consumer's prepaid calling card, as shown at block 152. In this manner, the consumer can earn a "pay off" by earning a given score on the merchant's game application. At block 154, the request to increase is processed, typically by validating a PIN or other password against the prepaid calling card to be incremented. At block 156, the value remaining parameter is incremented. The processing shown in blocks 152, 154 and 156 is performed by the clearinghouse 74.

Although the gaming application is listed here as an example, this aspect of the invention is not limited to gaming applications. Merchants could offer various types of incentives to consumers who conduct micropayment transactions at the merchants' sites. For example, merchants could offer specials on specific goods and/or services, such that if a consumer purchases those goods/services, the consumer receives bonus value units to be applied to his/her prepaid calling card. Also, the merchant could offer loyalty programs, whereby if a given consumer purchases a given quantity of goods/services, that consumer qualifies for discounts on future purchases or receives bonus value units to be applied to his/her prepaid calling card.

Figure 16:
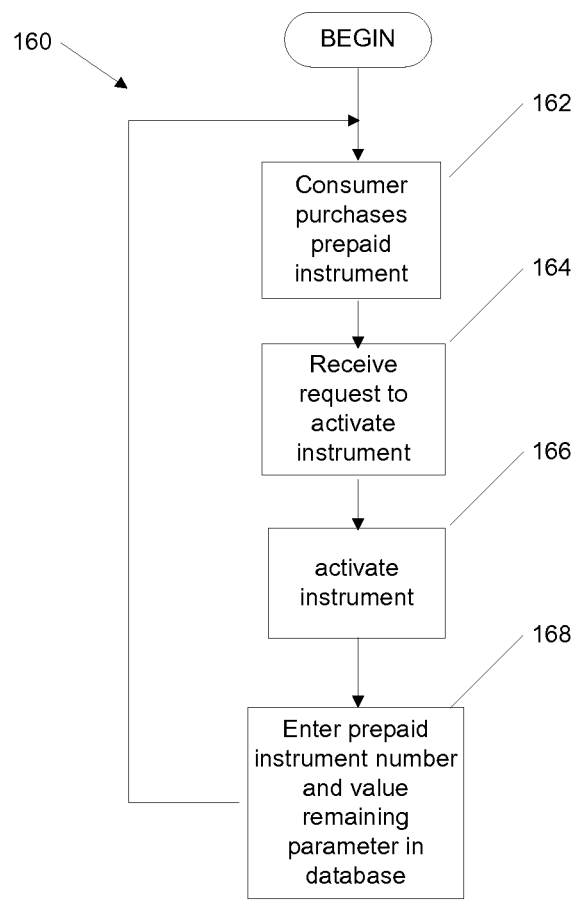
FIG. 16 is a flowchart of processing flow performed during activation of a prepaid calling card.

FIG. 16 is a flowchart of a processing flow 160 performed during activation of a prepaid calling card. The method of the invention can also be extended to activating the prepaid calling card in response to an activation request from a prepaid calling card issuer, as shown at block 164. The activating step enables the prepaid calling card to be used both for placing telephone calls and for conducting micropayment transactions with merchants. The activating step (block 166) is performed after the consumer acquires the prepaid calling card (block 162) for one of a cash payment, a credit card charge, a paper check payment, an electronic check payment, and for no charge. A merchant and/or issuer might offer the prepaid calling card to consumers free of charge as an incentive or promotion to drive web traffic to their sites. Also, the recharge or repurchase transactions referred to above can be executed by the consumer using the same payment methods. At block 168, the just activated prepaid calling card is entered into a database to support subsequent inquiry and transaction settlement Various embodiments of the invention can include validating a type of prepaid calling card presented by the consumer against the type of micropayment transaction sought by the consumer. Specifically, age or other restrictions may apply to certain micropayment transactions offered by a given merchant site, and those restrictions can be reflected in the types of prepaid calling card issued by issuers of the prepaid calling cards. In these embodiments, the process illustrated and discussed above in connection with FIG. 4 is employed to validate the proposed micropayment transaction.

The invention also provides a program storage device 129 (see FIG. 12) readable by a machine, embodying a program of instructions executable by the machine to perform the above method steps for settling a micropayment transaction conducted between a consumer and a merchant using a prepaid calling card presented by the consumer. The program storage device can include any magnetic, optical, or semiconductor based technology suitable for storing computer data, whether such technology involves either volatile or non-volatile storage media. Such media can include, but are not limited to, magnetic hard or floppy disks drives, optical media or CD-ROMs, and semiconductor-based memory technology, whether implemented in read-only or random access memory.

The method of the invention can be implemented using any number of programming languages, scripting or markup languages, or other environments, including but not limited to C, C++, Visual Basic, HTML, Java, or the like.

User Interface

Figure 17:
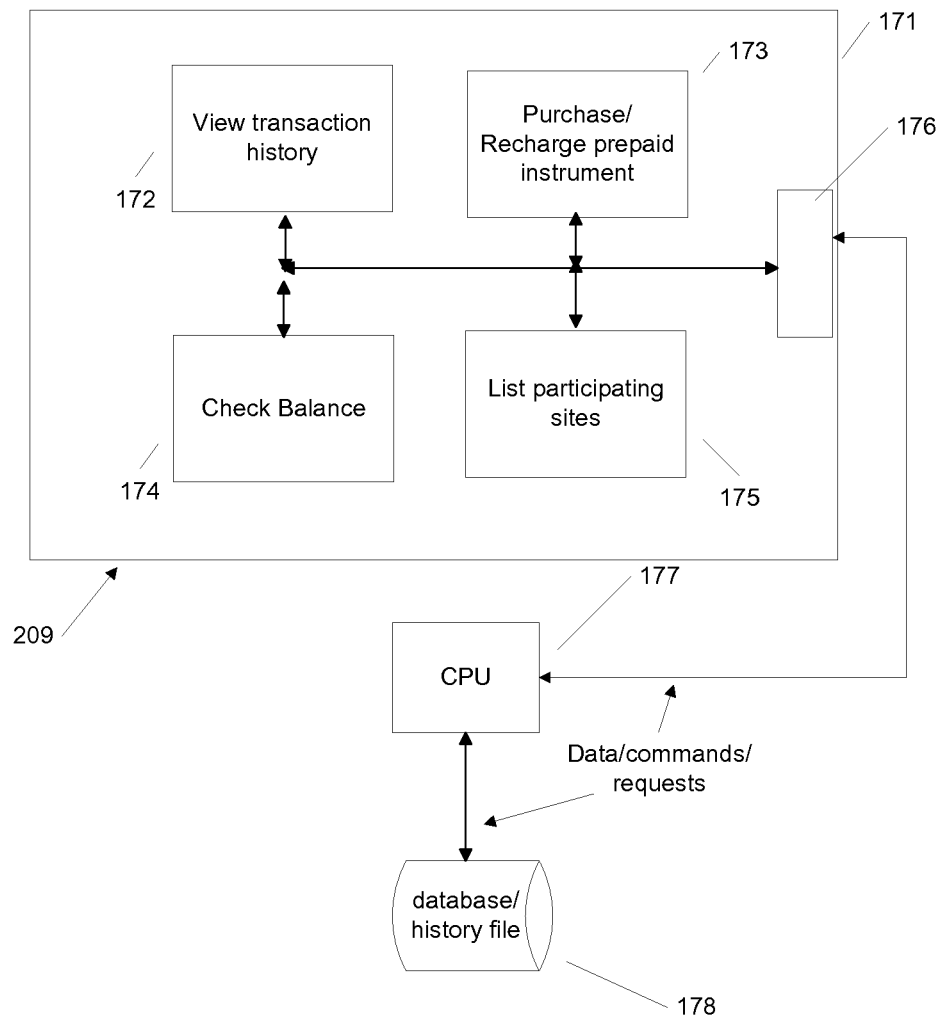
FIGS. 17 and 18 are block diagrams of user interfaces constructed according to the invention.
Figure 18:
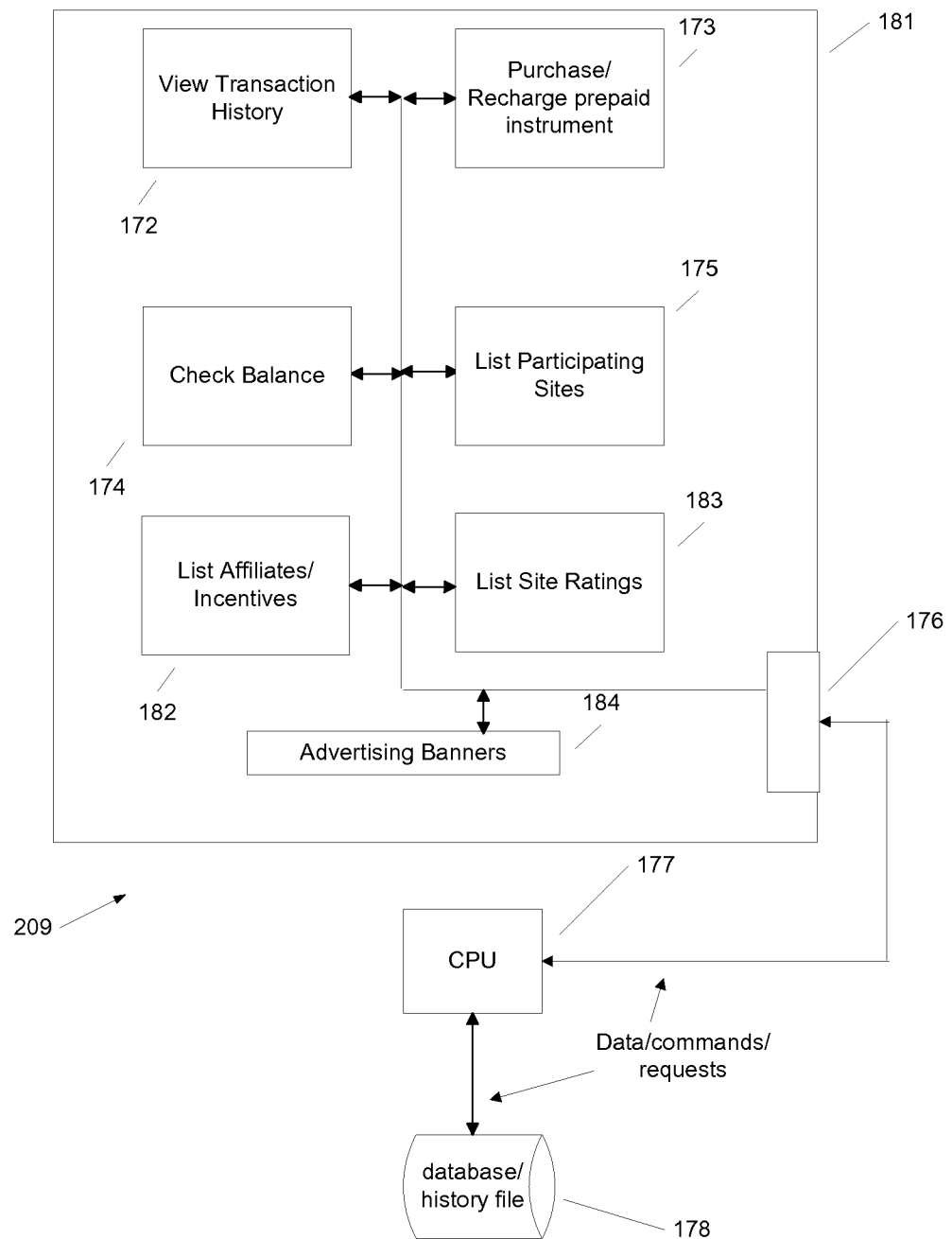

FIGS. 17 and 18 are block diagrams of user interfaces 171 and 181, respectively, provided according to the invention. The invention provides computer-implemented user interfaces 171 and 181 that support execution and settlement of a micropayment transaction conducted between a consumer and a merchant using a prepaid calling card presented by the consumer. In an illustrative implementation, the web portal 209 accessible over the Internet would host these interfaces 171 and/or 181 at a Uniform Resource Locator (URL) address that could be printed on the back of the prepaid calling card. By referring to the back of the prepaid calling card and accessing the web portal 209, the consumer can perform any of the functions described below relating to the prepaid calling card.

As would be understood by those skilled in the art, the various fields and sub-fields described below operate to accept data input from the consumer. In an illustrative embodiment of the invention, the main fields can be implemented as a button or other graphic user interface (GUI) icon, with the sub-fields accessible from forms that pop-up after the consumer clicks on the main icon. However, other implementations may be suitable in different applications. According to the embodiment of the invention shown in FIG. 17, the user interface 171 comprises the following.

A field 172 enables the consumer to view the transaction history associated with their prepaid instrument or card, for example by entering a card number and PIN. The system supports this function by routing the data input though field 172 through communication channel 176, to the CPU 177, which in turn accesses database/history file 178 to retrieve the requested transaction history.

A field 173 is adapted to receive data enabling the consumer to purchase additional value units for the prepaid calling card. This increment may be purchased, or possibly obtained free of charge, by any of the means discussed above. The field 173 may include additional sub-fields to handle entry of the prepaid calling card number and associated PIN, along with any other information needed to increment the value remaining parameter.

The field 173 could be augmented to receive data enabling the consumer to obtain at least a first prepaid calling card. The exact content of this data and the structure of the field 173 as augmented would depend on how the consumer is obtaining the prepaid calling card. As discussed above, the consumer can obtain the prepaid calling card for free, or for a payment tendered using several different methods. The interface can provide a variety of different sub-fields depending on the payment options offered by the entity hosting the interface. For example, if the hosting entity accepts credit cards, the field 173 would include sub-fields for entering credit card numbers, expiration dates, transaction amounts, etc. If the hosting entity accepts electronic checks drawn against a consumer's checking account, then the field 173 would include subfields for entering ABA routing numbers, account numbers, transaction amounts, etc. If the prepaid calling card is given to the consumer for free as part of a loyalty or rewards program, then the field 173 might contain a sub-field for an account number associated with such programs. Other possible payment options include, but are not limited to, debit card authorizations, cash, and paper check.

A field 174 is adapted to receive data enabling the consumer to check the balance remaining on his/her prepaid calling card, that is to inquire about a value remaining parameter associated with his/her prepaid calling card. The interface provides sub-fields to handle entry of the prepaid calling card number and associated PIN, along with any other information needed to access the value remaining parameter associated with the given prepaid calling card.

A field 175 lists web sites associated with merchants who accept data from the prepaid calling card to conduct micropayment transactions. By accessing this field 175, the consumer can identify those web merchants that accept the prepaid calling card for micropayment transactions.

Turning to the embodiment show in FIG. 18, user interface 180 provides additional fields 182, 183 and 184. The field 182 lists merchants or other affiliates who are offering incentives to consumers who use the prepaid calling card to conduct micropayment transactions at merchant websites. The field 183 lists a ratings system for merchant websites that accept data from the prepaid calling card to conduct micropayment transactions. This rating system can be an age-based system similar to the ratings system applied to movies, as commonly known, or another ratings system as may be appropriate in a given application. Finally, the interface can include the field 184 for advertising banners or the like to generate revenue for the web portal 209.

As would be understood by those skilled in the art, the interfaces 171 and 181 as described above serves as a front-end to a database, history file, or other suitable data structure 178 that stores the transaction history, remaining value parameter, prepaid calling card number, and PIN associated with a given prepaid calling card. The database, history file, or other suitable data structure 178 can also list merchant websites that accept the prepaid calling card, as well as lists of merchant websites that offer incentives to consumers using the prepaid calling card to conduct micropayment transactions. These interfaces 171 and 181 can be implemented using any number of programming languages, scripting or markup languages, or other environments, including but not limited to C, C++, Visual Basic, HTML, Java, or the like. The various fields shown in FIGS. 17 and 18 collect data from the consumer and transmit that data through a communication channel 176 to a central processing unit (CPU) 177, which couples the respective user interfaces 171 or 181 to the database 178.

FIGS. 17 and 18 show illustrative embodiments of user interfaces 171 and 181. However, it is understood that the layout, names and configuration of the fields and subfields described above may be varied as appropriate for a given application without departing from the scope of the invention.

Figure 19A:
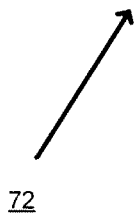
FIG. 19a is a diagram of a homepage accessible from an illustrative merchant website provided according to the present invention.

FIG. 19*a* is a diagram of a homepage 190 accessible from an illustrative merchant website 72 provided according to the present invention. The homepage 190 includes introductory text 190*a* and a link 72*a* to the homepage 190, a link 72*b* to a selection of photos available to the consumer, a link 72*c* to a selection of articles available to the consumer, a link 72*d* to a selection of games available to the consumer, and a link 72*e* enabling the consumer to access the portal 209 shown in FIG. 19. As understood by those skilled in the art, the consumer can access the material associated with each link 72*a*-72*e* by, for example, clicking on a selected link with an input device such as a mouse.

Figure 19B:
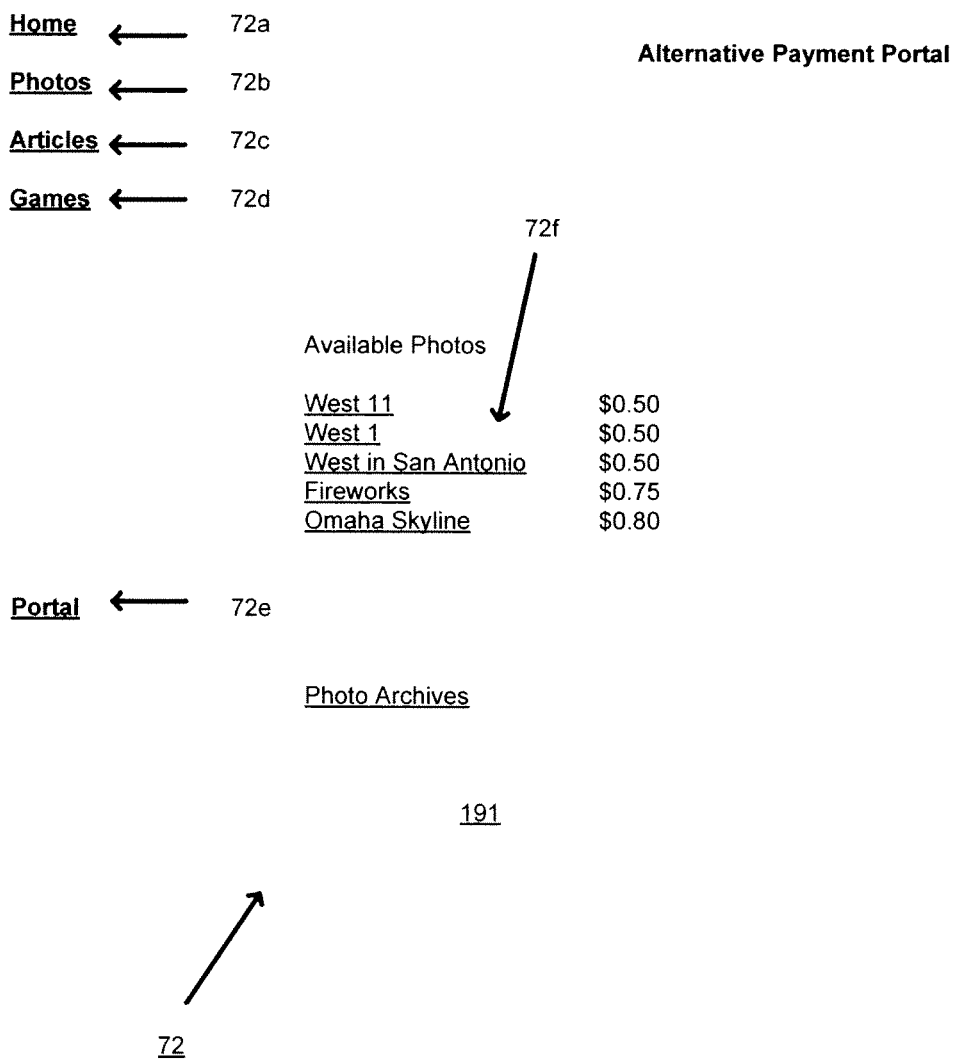
FIG. 19b is a diagram of an illustrative webpage accessible from the homepage shown in FIG. 19a, should the consumer select the "Photos" link shown therein.

FIG. 19*b* is a diagram of an illustrative webpage 191 accessible from the homepage 190 shown in FIG. 19*a*, should the consumer select the "Photos" link 72*b* shown therein. This webpage 191 lists a series of photos links, such as photo link 72*f*, from which the consumer may select, along with prices charges for each photo.

FIG. 19*c* is a diagram of an illustrative webpage 192 accessible from the webpage 191 shown in FIG. 19*b*, should the consumer select, for example, the photo link 72*f* shown therein. Photo link 72*f* is associated with, for example, a photo entitled "West in San Antonio". The webpage 192 presents the title and price of the photo, and the consumer can click the "Continue" button to confirm the purchase. As shown, the webpage 192 also pulls and presents data associated with the consumer's prepaid instrument. This data could include parameters such as units available on the instrument, the price of each unit, and the corresponding monetary value associated with the instrument. This data could also include the price of the item under consideration, and the monetary balance and unit balance that would remain on the instrument should the consumer conclude the proposed purchase.

FIG. 19*d* is a diagram of an illustrative webpage 193 accessible from the homepage 190 shown in FIG. 19*a*, should the consumer select the "Articles" link 72*c* shown therein. Similar to the webpage 192 shown in FIG. 19*c*, the webpage 193, presents the title and price of the selected article, and also presents the data pulled from the consumer's prepaid instrument. The webpage 193 also illustrates how a round-up function may be applied to the units removed from the consumer's instrument, in this example, 11.5 units ($1.15 divided by $0.1 per unit) are rounded up to 12 whole units.

FIG. 19*e* is a diagram of an illustrative webpage 194 accessible from the homepage 190 shown in FIG. 19*a*, should the consumer select the "Games" link 72*d* shown therein. Similar to webpages 192 and 193, the webpage 194 presents the title and price of the selected game, and also presents the data pulled from the consumer's prepaid instrument, FIG. 19*f* is a diagram of an illustrative webpage 195 accessible from the homepage 190 shown in FIG. 19*a*, should the consumer select the "Portal" link 72*e* shown therein. Should the merchant website 72 and the portal 209 be hosted by different entities (for example, the merchant site and the clearinghouse site), the link 72*e* would redirect the consumer between the two sites as known by those skilled in the art. Otherwise, the consumer would remain on the same site to access webpage 195. The webpage 195 includes a link 172, which corresponds to field 172 shown schematically in FIGS. 17 and 18, that enables the consumer to access transaction history associated with the consumer's instrument. Link 174, which corresponds to field 174 shown schematically in FIGS. 17 and 18, enables the consumer to access balance(s) associated with the instrument(s) held by the consumer. Link 173, which corresponds to field 173 shown schematically in FIGS. 17 and 18, enables the consumer to add units to the instrument. Link 175, which corresponds to field 175 shown schematically in FIGS. 17 and 18, lists those sites that accept prepaid instruments to conduct micropayment transactions. Link 182, which corresponds to field 182 shown schematically in FIG. 18, lists vendors that offer incentives or are otherwise affiliated with the prepaid instrument or calling card program. Link 183, which corresponds to field 183 shown schematically in FIG. 18, lists the site and card rating system, should such system be implemented in a given application of the invention.

FIG. 19*g* is a diagram of an illustrative webpage 196 accessible from the webpage 195 shown in FIG. 19*f*, should the consumer select the "View Transaction History" link 172 shown therein. Webpage 196 can generally list debits and credits associated with each instrument number held by the consumer, along with detailed parameters associated with each debit and credit.

Figure 19H:
FIG. 19h is a diagram of an illustrative webpage accessible from the webpage shown in FIG. 19f, should the consumer select the "View Balance" link shown therein.

FIG. 19*h* is a diagram of an illustrative webpage 197 accessible from the webpage 195 shown in FIG. 19*f*, should the consumer select the "View Balance" link 174 shown therein. As shown, webpage 197 presents the instrument number, the units available on the instrument, the monetary value per unit, and the resulting monetary value on the instrument.

FIG. 19*i* is a diagram of an illustrative webpage 198 accessible from the webpage 195 shown in FIG. 19*f*, should the consumer select the "Add Units to Card" link 173 shown therein. As shown, webpage 198 presents the consumer with a plurality of fields receiving payment information from the consumer. Respective fields are provided to receive, for example, the number of the instrument to be "recharged", the amount to add to that instrument, the name, number, and expiration date of a credit card to which to charge the fee associated with the recharge.

The previous description set forth a set of illustrative embodiments intended to facilitate understanding of the invention by those skilled in the art. However, this description is not intended to limit the invention, as those skilled in the art will recognize that this description can be varied, modified, and/or extended to other applications within the scope and spirit of the invention. Accordingly, the scope of the invention should be determined from the claims appended hereto.

We claim:

1. A method, comprising:
receiving a request from a merchant at a program storage device to authorize a proposed micropayment transaction to be settled against a prepaid instrument;
processing the request at a processor coupled to the program storage device;
responding to the request with an authorization decision; and
dispositioning the proposed micropayment transaction by the processor based on a monetary conversion rate for value units and a deduction in the value units corresponding to any incentives given by the merchant.

2. The method of claim 1, wherein the step of receiving a request includes receiving data including at least a prepaid instrument number and a personal identification number (PIN) associated with the prepaid instrument.

3. The method of claim 1, wherein the step of receiving a request includes receiving a request to authorize a proposed micropayment transaction for a first value to be settled against a prepaid calling card.

4. The method of claim 1, wherein the step of processing the request includes accessing a database to retrieve a value remaining parameter, using data from the prepaid instrument as an index into the database, and comparing the value provided by the merchant to the value remaining parameter to determine whether to authorize the micropayment transaction for settlement.

5. The method of claim 1, wherein the step of processing includes determining that a value remaining parameter is sufficient to authorize the micropayment transaction for settlement.

6. The method of claim 1, wherein the step of responding includes one of authorizing the proposed micropayment transaction for settlement and declining the proposed micropayment transaction for settlement.

7. The method of claim 3, wherein the step of dispositioning the micropayment transaction includes decrementing a value remaining parameter according to the first value, and transferring a payment to the merchant to settle the micropayment transaction.

8. The method of claim 1, wherein the step of processing includes determining that a value remaining parameter is insufficient to authorize the micropayment transaction for settlement.

9. The method of claim 1, wherein the step of dispositioning the micropayment transaction includes terminating the micropayment transaction.

10. The method of claim 8, wherein the step of dispositioning the micropayment transaction includes, after the micropayment transaction has been declined for settlement, enabling the consumer to perform one of: increasing a value remaining parameter, and purchasing a second prepaid instrument having a second value remaining parameter greater than the first value.

11. The method of claim 10, wherein the step of enabling is performed by software hosted on a merchant website.

12. The method of claim 10, wherein the step of enabling is performed by software hosted by a settlement clearinghouse.

13. The method of claim 10, further comprising the step of receiving a second request from the merchant to authorize the micropayment transaction.

14. The method of claim 13, wherein the step of receiving a second request from the merchant is performed after the value remaining parameter has been increased.

15. The method of claim 13, wherein the step of receiving a second request from the merchant is performed after the second prepaid instrument has been purchased.

16. The method of claim 1, wherein the step of comparing includes exchanging between a unit of value used to conduct the micropayment transaction and a unit of value associated with the prepaid instrument.

17. The method of claim 16, wherein the step of exchanging includes converting between units of time and units of monetary currency.

18. The method of claim 16, wherein the step of exchanging includes converting between two different units of monetary currency.

19. The method of claim 1, wherein the steps of comparing and responding are performed in real time.

20. The method of claim 7, wherein the step of transferring a payment includes originating the payment to the merchant from an issuing entity that issued the prepaid instrument to the consumer.

21. The method of claim 20, wherein the step of originating the payment includes transferring the payment from the issuing entity directly to the merchant.

22. The method of claim 20, wherein the step of originating the payment includes transferring the payment from the issuing entity indirectly to the merchant through at least one intermediary.

23. The method of claim 20, wherein the step of transferring a payment includes aggregating multiple micropayment transactions involving prepaid instruments issued by a given instrument issuer into a composite settlement transaction to be settled against the given instrument issuer.

24. The method of claim 20, wherein the step of transferring a payment includes aggregating multiple micropayment transactions involving prepaid instruments issued by a given instrument issuer and involving a given merchant into a composite settlement transaction to be settled against the given instrument issuer to the given merchant.

25. The method of claim 1, further comprising the step of receiving from the merchant a request to increment the value remaining parameter.

26. The method of claim 25, wherein the step of receiving the request to increment results from a consumer transaction conducted on a website associated with the merchant.

27. The method of claim 25, wherein the step of receiving the request to increment occurs in response to a consumer transaction conducted on a website associated with the merchant, the website hosting a gaming application, and the request to increase resulting from the consumer transacting with the gaming application and achieving a score that reaches a predetermined threshold.

28. The method of claim 1, further comprising the step of activating the prepaid instrument in response to an activation command from a prepaid instrument issuer.

29. The method of claim 28, wherein the step of activating the prepaid instrument enables the prepaid instrument to be used both for placing telephone calls and for conducting micropayment transactions with merchants.

30. The method of claim 29, wherein the step of activating is performed after the consumer acquires the prepaid instrument for one of: a cash payment, a credit card charge, a paper check payment, an electronic check payment, and for no charge.

31. The method of claim 1, further comprising the step of incrementing the value remaining parameter in response to a recharge transaction executed by the consumer using one of: a cash payment, a credit card charge, a paper check payment, an electronic check payment, and for no charge.

32. The method of claim 1, further comprising the step of validating a type of prepaid instrument presented by the consumer against the type of micropayment transaction sought by the consumer.

33. A program storage device readable by a machine, tangibly embodying a program of instructions executable by the machine to perform:

- receiving a request from a merchant at a program storage device to authorize a proposed micropayment transaction to be settled against a prepaid instrument;
- processing the request at a processor coupled to the program storage device;
- responding to the request with an authorization decision; and
- dispositioning the proposed micropayment transaction by the processor based on a monetary conversion rate for value units and a deduction in the value units corresponding to any incentives given by the merchant.

\* \* \* \* \*